(12) United States Patent
Kupczak et al.

(10) Patent No.: US 12,088,961 B2
(45) Date of Patent: Sep. 10, 2024

(54) SYSTEM AND METHOD FOR RECORDING ONLINE COLLABORATION

(71) Applicant: Promethean Limited, Blackburn (GB)

(72) Inventors: Maciej Kupczak, Wroclaw (PL); Lukasz Krystek, Sieradz (PL); Piotr Śliwiński, Wroclaw (PL); Reshan Richards, Ridgefield, CT (US); Bartosz Gonczarek, Kamieniec Wroclawski (PL)

(73) Assignee: Promethean Limited, Blackburn (GB)

( * ) Notice: Subject to any disclaimer, the term of this patent is extended or adjusted under 35 U.S.C. 154(b) by 0 days.

(21) Appl. No.: 18/476,878

(22) Filed: Sep. 28, 2023

(65) Prior Publication Data

US 2024/0098217 A1  Mar. 21, 2024

Related U.S. Application Data

(63) Continuation of application No. 17/675,056, filed on Feb. 18, 2022, now abandoned, which is a
(Continued)

(51) Int. Cl.
*H04N 7/15* (2006.01)
*G06Q 10/10* (2023.01)

(52) U.S. Cl.
CPC ........... *H04N 7/155* (2013.01); *G06Q 10/103* (2013.01)

(58) Field of Classification Search
CPC ............. H04L 12/1813; H04L 12/1818; H04L 12/1827; H04L 47/70; H04L 47/74;
(Continued)

(56) References Cited

U.S. PATENT DOCUMENTS 7,248,684 B2   7/2007 Caspi et al.
7,636,754 B2  12/2009 Zhu et al.
(Continued)

FOREIGN PATENT DOCUMENTS

CA   2388879   5/2001
CA   2644583  11/2007
(Continued)

*Primary Examiner* — Kostas J Katsikis
(74) *Attorney, Agent, or Firm* — Thomas | Horstemeyer, LLP

(57) ABSTRACT

An online collaboration recording system for recording an online collaboration session, includes a computing arrangement in communication with a plurality of devices, wherein each device is accessible by a user during the online collaborating session, wherein in operation the computing arrangement executes instructions to synchronize a digital project in the online collaborating session amongst the plurality of devices, by: establishing, via communication module, the online collaboration session for performing collaborative work on digital project, the digital project comprising at least one object; receiving, via the communication module or an input interface, a first user input and based thereon modifying one or more properties of at least one object to form at least one modified object; recording temporally, via a recorder, at least one state of at least one modified object to compile a temporal record; and synchronizing, via the communication module, temporal record amongst the plurality of devices.

20 Claims, 12 Drawing Sheets

Related U.S. Application Data continuation-in-part of application No. 16/593,172, filed on Oct. 4, 2019, now Pat. No. 11,258,834.

(60) Provisional application No. 62/741,735, filed on Oct. 5, 2018.

(58) Field of Classification Search
CPC .................. H04L 47/76; H04L 65/403; H04L 65/1069; H04L 65/1083; H04L 65/1096; H04L 65/4015; H04L 67/14; H04L 67/38; H04L 67/104; H04L 67/1095; H04L 69/24; H04M 3/42; H04M 3/56; H04N 7/15; H04N 7/155; G06F 11/2056; G06F 16/10; G06F 16/27; G06Q 10/101; G06Q 10/103
See application file for complete search history.

(56) References Cited

U.S. PATENT DOCUMENTS

| | | |
|---|---|---|
| 7,647,373 B2 | 1/2010 | Johnson et al. |
| 7,714,222 B2 | 5/2010 | Taub et al. |
| 7,797,630 B2 | 9/2010 | Kashi |
| 7,945,621 B2 | 5/2011 | Yuan et al. |
| 7,954,049 B2 | 5/2011 | Fletcher et al. |
| 8,139,099 B2 | 3/2012 | Nelson |
| 8,209,181 B2 | 6/2012 | Heckerman et al. |
| 8,233,597 B2 | 7/2012 | Kerr et al. |
| 8,379,821 B1 | 2/2013 | Ramage et al. |
| 8,407,289 B2 | 3/2013 | Chen et al. |
| 8,903,905 B2 | 12/2014 | Cadou et al. |
| 9,141,710 B2 | 9/2015 | Amrhein et al. |
| 9,270,514 B2 | 2/2016 | Nam |
| 9,386,279 B2 | 7/2016 | Sumiyoshi et al. |
| 9,489,659 B1 | 11/2016 | Liu et al. |
| 9,953,036 B2* | 4/2018 | Mackenzie ........... G06F 16/178 |
| 10,229,518 B2 | 3/2019 | Carlos |
| 10,255,023 B2 | 4/2019 | Liu et al. |
| 10,298,667 B2 | 5/2019 | Cadou |
| 10,313,433 B2 | 6/2019 | Owens et al. |
| 10,431,187 B2 | 10/2019 | Miki |
| 10,459,985 B2 | 10/2019 | Shepherd et al. |
| 10,673,913 B2 | 6/2020 | Weber et al. |
| 10,742,436 B2 | 8/2020 | Franke et al. |
| 10,796,086 B2 | 10/2020 | Lewbel |
| 2002/0065912 A1 | 5/2002 | Catchpole et al. |
| 2004/0107270 A1 | 6/2004 | Stephens et al. |
| 2004/0133639 A1* | 7/2004 | Shuang ............... H04L 67/1095 709/204 |
| 2004/0143603 A1 | 7/2004 | Kaufmann et al. |
| 2004/0143630 A1 | 7/2004 | Kaufmann et al. |
| 2004/0153504 A1 | 8/2004 | Hutchinson et al. |
| 2004/0172595 A1 | 9/2004 | Lerner et al. |
| 2006/0010197 A1 | 1/2006 | Ovenden |
| 2006/0031755 A1 | 2/2006 | Kashi |
| 2007/0005697 A1 | 1/2007 | Yuan et al. |
| 2007/0005699 A1 | 1/2007 | Yuan et al. |
| 2007/0118794 A1 | 5/2007 | Hollander et al. |
| 2008/0120371 A1 | 5/2008 | Gopal |
| 2009/0292618 A1 | 11/2009 | Chatila |
| 2010/0030578 A1 | 2/2010 | Siddique et al. |
| 2014/0033073 A1 | 1/2014 | Pegg |
| 2015/0019486 A1 | 1/2015 | Gaikwad et al. |
| 2016/0149969 A1 | 5/2016 | Farmer et al. |
| 2017/0235537 A1* | 8/2017 | Liu ....................... G06F 3/1454 715/759 |
| 2018/0052813 A1* | 2/2018 | Laupretre ............. G06F 40/171 |

FOREIGN PATENT DOCUMENTS

| | | |
|---|---|---|
| CA | 2993664 | 2/2017 |
| EP | 3073673 | 9/2016 |
| GB | 2455392 | 6/2009 |
| JP | 2012209614 | 10/2012 |
| WO | 2006/128064 | 11/2006 |
| WO | 2007/066918 | 6/2007 |
| WO | 2011/095537 | 8/2011 |
| WO | 2012/091723 | 7/2012 |
| WO | 2014/167967 | 10/2014 |
| WO | 2015/155691 | 10/2015 |
| WO | 2015/155692 | 10/2015 |
| WO | 2015/155693 | 10/2015 |
| WO | 2016/100100 | 6/2016 |
| WO | 2017/187311 | 11/2017 |

* cited by examiner

SYSTEM AND METHOD FOR RECORDING ONLINE COLLABORATION

CROSS-REFERENCE TO RELATED APPLICATIONS

This application is a continuation of U.S. patent application Ser. No. 17/675,056, filed Feb. 18, 2022, which is a continuation-in-part of U.S. patent application Ser. No. 16/593,172, filed Oct. 4, 2019, now U.S. Pat. No. 11,258,834, issued Feb. 22, 2022, which claims the benefit of U.S. Provisional Patent Application Ser. No. 62/741,735, filed Oct. 15, 2018, the entire disclosures of which are hereby incorporated herein by reference in their entirety.

TECHNICAL FIELD

The present disclosure relates generally to collaborative work; and more specifically, to online collaboration recording systems for recording online collaboration sessions, and/or for enabling collaborative work on digital documents with timeline-based data. Furthermore, the present disclosure also relates to methods for recording online collaboration sessions. Moreover, the present disclosure also relates to computer program products comprising instructions to cause the aforesaid systems to carry out the aforesaid methods.

BACKGROUND

In recent years, the field of digital collaboration in a shared space has been growing exponentially. Digital collaboration refers to two or more people collaborating or meeting remotely on a digital project, over the shared space, to share documents, messages, or multimedia data. In order to collaborate digitally, each contributor needs to digitally communicate with other contributors, either directly or indirectly. Contributors may digitally connect with each other directly via peer-to-peer connection model or indirectly via client-server communication model. Each model has its own set of benefits and deficiencies associated with various systems and methods of digital collaboration.

An example of a digital collaboration in a shared space based on a synchronous system and method is most commonly used as online chat. Synchronous systems include exchange of information between participants simultaneously and in real-time. Another example includes web conferencing services where data shared in real-time is lost if not saved before the end of a session. Most common examples of asynchronous systems are forums, blogs, social medias and other such digitally shared spaces. Such systems include exchange of shared information between an uploader and subsequent visitors.

Many of the current (i.e., existing) collaboration systems are beginning to record the sessions, and to output the recorded sessions for distribution. For example, recording of a digital collaboration in a shared space is currently outputted as a video stream or as screen recordings. However, there are many shortcomings with such existing recordings of digital collaborations on a project. The complexity of shortcomings with such existing recordings increases with group projects where it is not possible to determine which individual contributes what content, neither it is possible to determine contents based on actions of such contributors or users. Complexity further increases with unlimited digital supply of content and with using these variety of contents (e.g., image, videos, pdf, gif, and other formats) in the shared space during the digital collaboration and its recording with present methods (of video or screen recording).

Therefore, in light of the foregoing discussion, there is a need to resolve the shortcomings associated with recording of digital collaborations on digital projects between multiple users as contributors and to synchronise such recordings with individual user's contribution.

SUMMARY

The present disclosure seeks to provide an online collaboration recording system for recording an online collaboration session.

The present disclosure also seeks to provide a method for recording an online collaboration session.

The present disclosure also seeks to provide a computer program product comprising instructions to cause the aforesaid system to carry out the aforesaid method.

The present disclosure provides an at least partial solution to the aforementioned technical problem, or problems, associated with known art. An aim of the present disclosure is to provide a solution that at least partially overcomes the aforementioned technical problem or problems.

In one aspect, an embodiment of the present disclosure provides an online collaboration recording system for recording an online collaboration session, comprising: a computing arrangement in communication with a plurality of devices, wherein each device is accessible by a user during the online collaborating session, wherein in operation the computing arrangement executes instructions to synchronize a digital project in said online collaborating session amongst the plurality of devices, by: (i) establishing, via a communication module, said online collaboration session for performing collaborative work on the digital project, the digital project comprising at least one object; (ii) receiving, via the communication module or an input interface, a first user input and based thereon modifying one or more properties of the at least one object to form at least one modified object; (iii) recording temporally, via a recorder, at least one state of the at least one modified object to compile a temporal record; and (iv) synchronizing, via the communication module, the temporal record amongst the plurality of devices.

Embodiments of the present disclosure substantially eliminate, or at least partially address, the aforementioned problems in the prior art and provide an online collaboration recording system that allows for creation, execution, recording, and sharing of useful contextual information pertaining to collaborative work performed during an online collaboration session. The online collaboration recording system is easy to integrate with existing computing hardware.

Optionally, in operation the computing arrangement edits the at least one modified object in the temporal record for outputting an output stream, by: (v) receiving, via the communication module or the input interface, a second user input; (vi) editing, via an editor, the temporal record based on the second user input; and (vii) outputting, via an output interface, the output stream based on the edited temporal record.

Optionally, the computing arrangement, in operation, edits the temporal record by any one of: adding an additional object to the temporal record, removing the at least one modified object from the temporal record, combining a plurality of modified objects in the temporal record, and modifying one or more properties of the at least one modified object in the temporal record.

Optionally, the at least one object or at least one modified object comprises one or more properties, the one or more properties comprises one or more of an on-screen position, on-screen size and content of the at least one object or at least one modified object.

Optionally, the content of the at least one object or at least one modified object comprises a set of temporal changes in properties of the at least one object or properties of the at least one modified object over a recorded period of time and/or one or more of a video file or an audio file.

Optionally, the at least one object or the at least one modified object is stored at a local data storage or a remote data storage as a set of objects or modified objects and temporal changes to each of the objects and modified objects.

Optionally, in operation the computing arrangement, via an encryption module, encrypts the temporal record prior to synchronizing the temporal record with the plurality of devices.

Optionally, in operation the computing arrangement or the plurality of devices, via a decryption module, decrypts the encrypted temporal record after synchronization.

In another aspect, an embodiment of the present disclosure provides a method for recording an online collaboration session, the method comprising: establishing the online collaboration session to allow for performing simultaneous collaborative work on a digital project, the digital project comprising at least one object, wherein the digital project is shared and simultaneously modified between a plurality of users; receiving a first user input from one of the plurality of users and based thereon modifying the at least one object to form at least one modified object; recording temporally at least one state of the at least one modified object to compile a temporal record; and synchronizing the temporal record amongst the plurality of users.

Optionally, the method further comprises: receiving a second user input; editing the temporal record based on the second user input; and outputting the output stream based on the edited temporal record.

Optionally, in the method, editing the temporal record comprises any one of: adding an additional object to the temporal record; removing the at least one modified object from the temporal record, combining a plurality of modified objects in the temporal record, and modifying one or more properties of the at least one modified object in the temporal record.

Optionally, in the method, the at least one object or at least one modified object comprises one or more properties, the one or more properties comprises one or more of an on-screen position, on screen size and content of the at least one object or at least one modified object.

Optionally, in the method, the content of the at least one object or at least one modified object comprises a set of temporal changes in properties of the at least one object or properties of the at least one modified object over a recorded period of time and/or one or more of a video file or an audio file.

Optionally, in the method, the at least one object or the at least one modified object is stored at a local data storage or a remote data storage as a set of objects or modified objects and temporal changes to each of the objects and modified objects.

Optionally, the method further comprises encrypting the temporal record prior to synchronizing the temporal record with the plurality of devices.

Optionally, the method further comprises decrypting the temporal record after synchronizing the temporal record with the plurality of devices.

In yet another aspect, an embodiment of the present disclosure provides a computer program product comprising instructions to cause the aforesaid system to carry out the aforesaid method.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
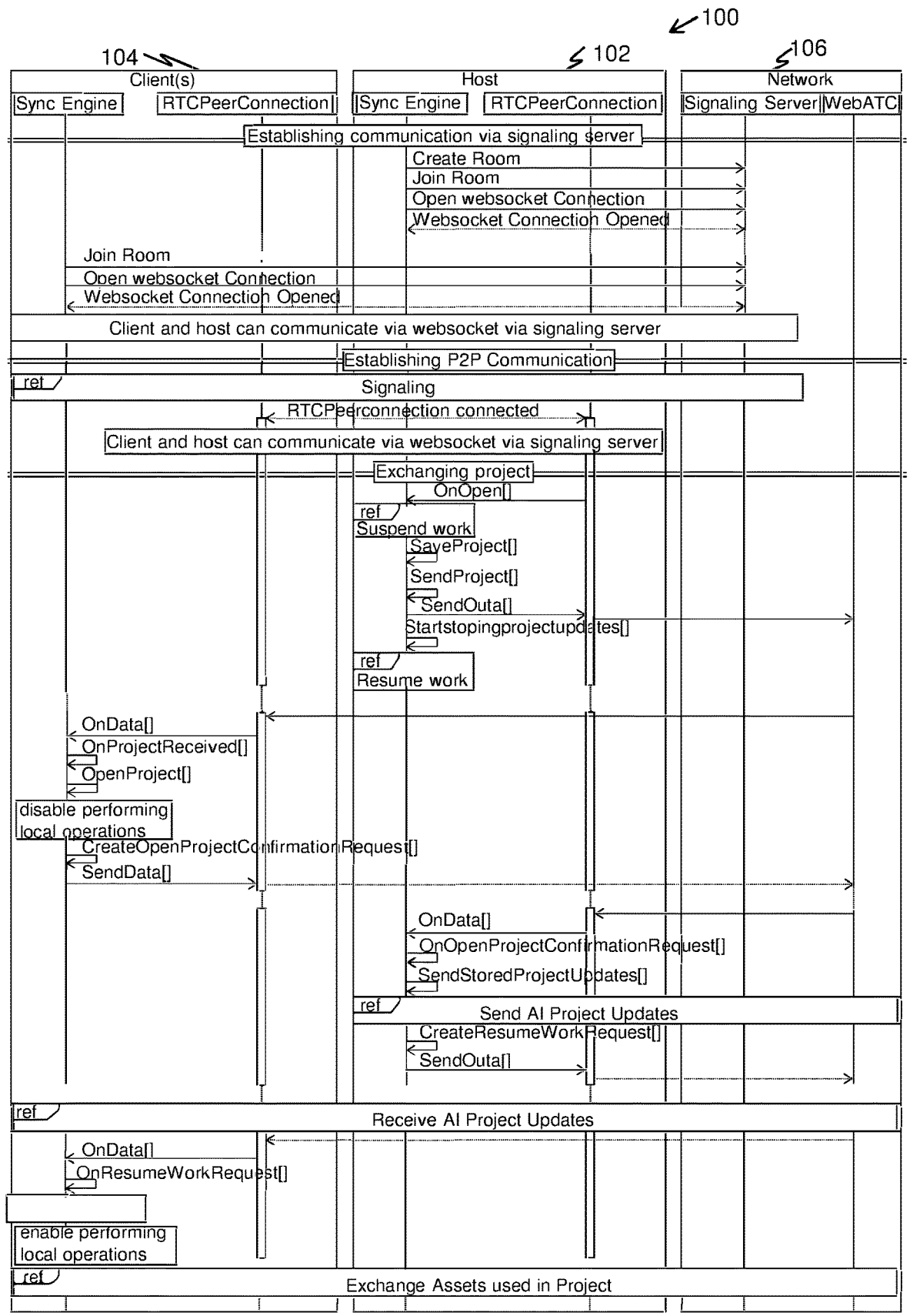
FIG. 1 illustrates an exemplary sequence diagram for establishment of connection between a computing arrangement with a plurality of devices, in accordance with an embodiment of the present disclosure.

FIG. 1 is an exemplary sequence diagram for implementation of an online collaboration recording system 100 for recording an online collaboration session, in accordance with an embodiment of the present disclosure. The online collaboration recording system 100 comprises a computing arrangement 102 in communication with a plurality of devices 104. Notably, the computing arrangement 102 is communicably coupled to the plurality of devices 104 via a communication network 106. Each device (of the plurality of devices 104) is accessible by a user during the online collaborating session.

Throughout the present disclosure, the term "computing arrangement" refers to hardware, software, firmware and/or any combination thereof, suitable for controlling operation of the online collaboration recording system 100. Notably, the computing arrangement 102 allows for recording the online collaboration session. Optionally, the computing arrangement 102 includes an arrangement of one or more computational entities that are capable of performing various computational tasks for operation of the online collaboration recording system 100.

Throughout the present disclosure, the term "device" refers to an electronic device associated with (or used by) a user that is capable of enabling the user to perform specific tasks associated with the online collaboration session. Furthermore, the term "device" is intended to be broadly interpreted to include any electronic device that may be used for voice and/or data communication over the communication network 106. Optionally, the plurality of devices 104 enable a plurality of users associated therewith to join and participate in the online collaboration session. In such a case, the plurality of devices 104 provides the plurality of users with an interactive user interface, using which the plurality participates in the online collaboration session. Optionally, the plurality of devices 104 comprises an Input/Output module (or 1/0 module) to enable the users to provide inputs to and receive outputs from the online collaboration session. Example of the plurality of devices 104 include but are not limited to, cellular phones, personal digital assistants (PDAs), handheld devices, wireless modems, laptop computers, tablet computers, personal computers, etc.

The term "communication network" refers to an arrangement of interconnected programmable and/or non-programmable components that are configured to facilitate data communication between the plurality of devices 104 and the computing arrangement 102. Furthermore, the communication network 106 may include, but is not limited to, one or more peer-to-peer network, a hybrid peer-to-peer network, local area networks (LANs), radio access networks (RANs), metropolitan area networks (MANs), wide area networks (WANs), all or a portion of a public network such as the global computer network known as the Internet, a private network, a cellular network and any other communication system or systems at one or more locations. Additionally, the communication network 106 includes wired or wireless communication that can be carried out via any number of known protocols, including, but not limited to, Web Real-Time Communication (WebRTC) protocols, Internet Protocol (IP), Wireless Access Protocol (WAP), Frame Relay, or Asynchronous Transfer Mode (ATM). Moreover, any other suitable protocols using voice, video, data, or combinations thereof, can also be employed. Optionally, the communication network 106 is robust and have substantially sufficient bandwidth in order to allow the access of the online collaborating session to the users of each device.

Optionally, the communication network 106 has a star topology. In the star topology, each device (of the plurality of devices 104) is connected to the computing arrangement 102 and the computing arrangement 102 acts as a central hub or host for facilitating communication between the plurality of devices 104. Therefore, in such a case, a given device is communicably coupled to another device in an indirect manner (namely, via the computing arrangement 102).

It will be appreciated that the aforementioned star topology can be implemented in several ways. In an example, the computing arrangement 102 can be implemented by way of at least one device. In such a case, the central hub or host runs on the at least one device amongst the plurality of devices, thereby enabling the digital collaboration system 100 to work as an ad-hoc session or a meeting solution. In another example, the computing arrangement 102 is implemented by way of a server, more specifically a back-end server. In such a case, the back-end server functions as the central hub. In such a case, the online collaboration recording system 100 works as a cloud or persistent document provider solution. Furthermore, in such a case, the back-end server is coupled in communication to the plurality of devices 104, via the communication network 106.

Optionally, the communication network 106 employs WebRTC technology to facilitate communication between the computing arrangement 102 and the plurality of devices 104. Optionally, in this regard, at least one signaling server establishes communication between the computing arrangement 102 and the plurality of devices 104 by way of WebRTC signaling.

Optionally, each of the plurality of devices 104 comprise a corresponding communication module to establish the online collaboration session. It will be appreciated that the communication modules of the plurality of devices 104 are compatible with a communication module of the computing arrangement 102, for enabling proper communication within the online collaboration recording system 100. Furthermore, all communication modules (of the plurality of devices 104, as well as the computing arrangement 102) are compatible with the WebRTC technology. Such communication modules may also be referred to as "Synchronization Engine".

As an example, in the online collaboration recording system 100 at least one signaling server room (hereinafter, referred to as "virtual room") and the plurality of users are discovered, and the communication network 106 employs the WebRTC PeerConnection to facilitate real time communication transport between the computing arrangement 102 and the plurality of devices 104. In such an example, the WebRTC PeerConnection enables the online collaboration session between the central hub and the plurality of devices 104, via the at least one signaling server. Furthermore, the WebRTC PeerConnection employs Web Sockets as the at least one signaling server. Moreover, in the real-time the WebRTC data channels are employed for exchanging data, actions and control messages (for example, such as file-transfer) between peers. Furthermore, WebRTC MediaTracks are employed for real-time media (for example, such as audio and/or video). As shown, the communication network 106 is responsible for mixing, forwarding and recording media from and/or to all peers. The communication network 106 establishes signaling connection between the computing arrangement 102 and the plurality of devices 104, via the at least one signaling server. As a result, the virtual room is created, wherein each virtual room has a unique identifier used by other peers to join it. Furthermore, the unique identifier related to a given virtual room can be employed by the plurality of users to join the online collaboration session.

Optionally, upon successful establishment of communication between the computing arrangement 102 and the plurality of devices 104, the computing arrangement 102 executes instructions to start a collaborative work or to keep continuing currently ongoing collaborative work. It will be appreciated that the currently ongoing collaborative work would not be suspended before establishing said online collaboration session to allow for users of the plurality of devices 104 to complete any currently ongoing work, prior to joining the online collaborating session for collaboratively working on the digital project. Alternatively, optionally, upon successful establishment of communication between the computing arrangement 102 and the plurality of devices 104, the computing arrangement 102 executes instructions to suspend currently ongoing collaborative work. More details pertaining to such suspension of the currently ongoing collaborative work have been described herein later in conjunction with FIG. 2.

In operation, the computing arrangement 102 executes instructions to synchronize a digital project in said online collaborating session amongst the plurality of devices 104, by: (i) establishing, via a communication module, said online collaboration session to allow for performing collaborative work on the digital project, the digital project comprising at least one object; (ii) receiving, via the communication module or an input interface, a first user input and based thereon modifying one or more properties of the at least one object to form at least one modified object; (iii) recording temporally, via a recorder, at least one state of the at least one modified object to compile a temporal record; and (iv) synchronizing, via the communication module, the temporal record amongst the plurality of devices 104.

Throughout the present disclosure, the term "online collaboration session" refers to a communication session that is temporarily established between the computing arrangement 102 and the plurality of devices 104 for facilitating interactive exchange of information between the plurality of devices 104. Such interactive exchange of information between the plurality of devices 104 pertains to collaborative work that is to be performed on the digital project, by the plurality of users. Notably, in the online collaboration session, the plurality of devices 104 communicate with each other via messages and optionally, responses to said messages. Furthermore, in the online collaboration session, the computing arrangement 102 detects and manages conflicts between the plurality of devices 104.

Optionally, when said online collaboration session is established at (i), the plurality of users join a virtual room (or a network-based room) for performing collaborative work on the digital project. Optionally, in such a case, the plurality of users perform said collaborative work in real time or near real time.

Throughout the present disclosure, the term "collaborative work" refers to simultaneous working (for example, by way of editing content, creating content, deleting content, and the like) of the plurality of users on a given part or an entirety of the digital project. Simply put, the collaborative work relates to performing changes to the given part of the digital project over time, upon collaboration of the plurality of users. In such a case, the changes implemented on the digital project, by a given user can be recorded and are shared with the remaining users working on the same digital project, simultaneously.

Throughout the present disclosure, the term "digital project" refers to a computer-based project upon which the plurality of users collaborate to perform meaningful work. Such a digital project could pertain to a number of domains including, but not limited to, business, education, military, medical science. In an example, the digital project can be a video project related to marketing of a product or a business. In another example, the digital project can be an audio-visual project related to demonstrating a technique for research project. In yet another example, the digital project can be a digital presentation related to historical facts. In still another example, the digital project can be a digital document related to findings of a scientific experiment.

Throughout the present disclosure, the term "object" refers to a data construct of the digital project upon which collaborative work is to be performed by the plurality of users. By "at least one" it is meant that in some implementations, the digital project comprises a single object whereas in other implementations, the digital project comprises a plurality of objects. Moreover, by way of the online collaboration recording system 100, multiple users can synchronously or asynchronously collaborate for working on the given digital project. Examples of at least one object include, but are not limited to, time object, audio object, image object, text object, drawing object.

Optionally, the at least one object is a camera object, wherein the camera object comprises a recordable property describing camera viewfinder location. The term "camera viewfinder location" refers to location data (specific to type of the digital project) allowing for determining which part of the digital project is covered by an abstract camera. Furthermore, in an exemplary 2-D application, a camera viewfinder frame is an on-screen rectangle used to determine or inform an area of the digital project that is visible while replaying recording or after conversion of said recording to at least one video file. The camera viewfinder frame is independent of the user viewport, but may be synchronized together using at least one of: the camera viewfinder frame may follow the user viewport so as to record similar to local screen capture of the digital project; the user viewport may follow another user viewport, wherein output is up to user; or maybe a combination of the two. Furthermore, the recordable property of the camera viewfinder location describes location of the user viewport in the digital project. Additionally, the recordable property of the camera viewfinder location is dependent on nature of the digital project, such as for example, visible rectangle in a whiteboard or any two-dimensional (2-D) infinite space (i.e., when the camera viewfinder location becomes the camera viewfinder frame), page in a document, slide on presentation, and/or combination of position, orientation vector and field of view in three-dimensional (3-D) space. Furthermore, the camera viewfinder location and the user viewport have been described herein later in conjunction with FIG. 10.

Optionally, for synchronously collaborating on the given project, the plurality of users perform collaborative work at the same time. In such a case, any change to the digital project made by a user would be visible to all other users in real time. Optionally, for asynchronously collaborating on the given project, the plurality of users perform collaborative work at different times, wherein the plurality of users have ability to provide simultaneous input. Herein, the simultaneous input may be collected independently on various devices, with all manipulations (i.e., changes) being collected asynchronously and joined together to form a chain of activities. In such a case, any change to the digital project made by a user would be transmitted to all other users in real time, and would be visible to such users when they choose to work on the digital project.

It will be appreciated that said online collaboration recording system 100 is not limited to a session with objects in two-dimensional (2-D) infinite space as a same arrangement and set of rules applies for a three-dimensional (3-D) space, wherein the 3-D space is an extension of space and object properties. In particular, the online collaboration recording system 100 is flexible enough to be applied to a broad range of digital projects such as, but not limited to, whiteboards, text files, spreadsheets, video projects.

Optionally, upon successful establishment of the online collaboration session, the computing arrangement 102 executes instructions to resume the collaborative work on the digital project. More details pertaining to resuming the collaborative work on the digital project have been described herein later in conjunction with FIG. 3.

At (ii), the first user input is received via the communication module or an input interface. Notably, based upon the first user input, one or more properties of the at least one object are modified to form at least one modified object. The first user input could be in form of a touch input, a voice input, a digital command, a gesture input, and the like. Upon performing such modification on the at least one object, properties of the at least one change and such object becomes the at least one modified object. Therefore, the term "modified object" refers to an object whose properties are modified according to the first user input. It will be appreciated that at a given time, the digital project may include multiple objects but only some objects among such multiple objects may be modified in the aforesaid manner. Such modification of the at least one object can be understood to be a "collaboration action" pertaining to the online collaboration session.

Optionally, upon receiving the first user input, new data might be added, or existing data might be altered for at least one object. Herein, one or more properties referring to the new data may be modified to form at least one modified state in at least one modified object. In an example, a collaborative session adds new data, wherein the new data comprises recording voice of any given user. Herein, the new data is in form of waveform bytes which are stored in a file on a disk. Subsequently, such a file is represented by an audio object comprising a current time recordable property, denoted as "current time" which refers to a point in time in the audio file when the new data is inserted.

Optionally, at a given time, only a single collaboration action is performed within the online collaboration session. Alternatively, optionally, at a given time, a plurality of collaboration actions are performed within the online collaboration session.

Optionally, any collaboration action pertaining to the online collaboration session uses an operation object as a proxy. In this regard, the operation object is a state machine object that provides a generic mechanism for implementing at least one collaboration action in the digital project. Optionally, the operation object is created as a result of end-user input, but could also be created by automated test bot or specifically tailored bot. In such a case, the automated test bot or specifically tailored bot is also coupled in communication with the computing arrangement 102 via the communication network 106. More details of the operation object are elucidated herein later in conjunction with FIG. 4.

In an embodiment, when the computing arrangement 102 is implemented as a back-end server, the first user input is received via the communication module. In another embodiment, when at least one computing module of the computing arrangement 102 is implemented at one or more of the plurality of devices 104, the first user input is received via the input interface of said one or more of plurality of devices 104.

Optionally, the at least one object or at least one modified object comprises one or more properties, the one or more properties comprises one or more of an on-screen position, on screen size and content of the at least one object or at least one modified object. The term, "property" refers to an attribute associated with the at least one object or the at least one modified object of the digital project pertaining to which collaborative work is performed by the plurality of users during the online collaboration session. Notably, the one or more properties of the at least one object or at least one modified object are well-defined. Examples of one or more properties may include, but are not limited to on-screen position, on-screen size and content (for example, such as image, audio and the like) of the at least one object or at least one modified object.

Optionally, the at least one object or at least one modified object comprises one or more recordable properties. Optionally, the one or more recordable properties vary with respect to time. In an example, the one or more recordable properties may relate to an on-screen position of the at least one object or the at least one modified object.

Optionally, the content of the at least one object or at least one modified object comprises a set of temporal changes in properties of the at least one object or properties of the at least one modified object over a recorded period of time and/or one or more of a video file or an audio file. In such a case, the content of the at least one object or at least one modified object refers to a given data which is a part of the collaborative work. Such change in the content is additionally reflected in related state of the at least one object or the at least one modified object which might be recordable. Furthermore, such state is designed to reflect characteristics (i.e., attributes, or condition) of the content at any given point in recording time which allows for effective playback of changes made to content across time. In an example, the at least one object may be a drawing object, wherein the content of the drawing object is an ordered set of lines and points. Furthermore, new content is added to the drawing object, wherein the new content comprises a new line or new points. Additionally, the drawing object further comprises a recordable state, wherein the recordable state is a pair of indices pointing to the ordered set of lines and points as well as the new line and the new point in the last visible line. In an example, the content of the at least one object or at least one modified object comprises one or more of the video files for example, such as a video data or the audio file for example, such as a voice data.

Alternatively, optionally, the content of the at least one object or at least one modified object comprises an image file. In such a case, the content of the at least one object or at least one modified object includes images, graphics and the like.

Yet alternatively, optionally, the content of the at least one object or at least one modified object comprises a text file. In such a case, the content of the at least one object or at least one modified object includes textual data, spreadsheet documents and the like.

Optionally, the at least one object or the at least one modified object is stored at a local data storage or a remote data storage as a set of objects or modified objects and temporal changes to each of the objects and modified objects. In an example, the local data storage as the set of objects or the modified objects and temporal changes to each of the objects and the modified objects can be implemented by a way of memory unit associated with operation-initiating device and/or memory unit associated with operation-receiving device. In another example, the remote data storage can be implemented by a way of memory module of the computing arrangement 102. In such a case, the memory module of computing arrangement 102 may be a memory unit of computing arrangement 102 or a database arrangement coupled in communication with computing arrangement 102. In yet another example, the remote data storage can be implemented by a way of cloud server arrangement communicably coupled to the online collaboration recording system 100.

Optionally, the digital project further comprises at least one track, wherein a given track represents how the one or more recordable properties of the at least one object or at least one modified object vary with respect to time. In other words, a given track represents changes of a given recordable property of a given object or a given modified object. Such changes are made by the plurality of users working in the digital project during the online collaboration session.

Optionally, the digital project further comprises at least one asset, wherein a given asset represents at least one file used by a given object. Examples of such files include, but are not limited to, the video file, the audio file, the image file, the text file.

Optionally, a given asset is associated with a single object. Alternatively, optionally, a given asset is associated with a plurality of objects.

Optionally, the digital project further comprises a time object, wherein the time object represents a time duration of the digital project in form of a plurality of frames. A single frame is a discrete unit of time in which a current state of the one or more recordable properties of the at least one object or the at least one modified object is recorded. Furthermore, optionally, the time object comprises a current frame index.

Optionally, a given frame type is specific to a given recordable property. Notably, for a given object or a given modified object, the current state of its one or more recordable properties can be stored in a corresponding frame. Such a frame can be referred to as a "record frame". Optionally, the current state of the one or more recordable properties of the given object or the given modified object is restored from a corresponding record frame into a replay frame. It will be appreciated that by coordinating restoring of recorded state between all objects (whether modified or not) and their recordable properties, the online collaboration recording system 100 allows for restoring a state of the digital project at any given point in time. This allows to provide "replay" functionality which can be utilized by the plurality of users to view the temporal record of the collaborative work performed on the digital project instead of a final effect of said collaborative work. This provides the plurality of users with useful contextual information pertaining to the collaborative work performed during the online collaboration session. Optionally, the track records the plurality of frames sequentially relative to an abstract timeline. Herein, the time object is abstracted from absolute time. Furthermore, optionally, the time object comprises a current frame index. Moreover, the tracks share a common time base, denoted by "Time 0", wherein the "Time 0" defines beginning of recording of the track. Additionally, the digital project comprises a state to represent current timeline position of the digital project, denoted by "current time point", wherein the "current time point" is relative to the "Time 0". Subsequently, the digital project further comprises recording duration, wherein the recording duration represents the duration of the overall recording relative to "Time 0". Consequently, later playback and conversion to video of the recorded state changes are in synchronization across multiple objects. Furthermore, consequently, recording may be iterated, wherein new temporal records may be inserted in the middle or at the end of an existing digital project and mixing new temporal records with previous temporal records. In an example, the user may record changes made to a digital document, wherein the digital document is a whiteboard. Herein, the recorded changes made to the digital document may be represented as timeline of changes made during a collaborative session or across multiple collaborative sessions. Furthermore, the time comprises tracks representing changes made to specific objects in time.

Optionally, upon creation of a given project, at least one unique identifier is created for at least one of: the at least one object, the at least one track, the at least one asset.

In an example, a given digital project may pertain to creating a video to market a product. In such an example, the digital project may comprise the at least one object, the at least one track, the at least one asset. Moreover, each object, track, and asset has its own unique identifier that is created upon creation of said object, track, and asset. For example, the at least one object may comprise an image object having a unique identifier. In such an example, the defined sets of properties associated with the image object may include position (x,y), size (width, height) of the image object, and a corresponding image as asset. Furthermore, in such an example, the position (x,y) is identified as the at least one recordable property which changes over time and the position track is identified as the asset track for the image object.

At (iii), at least one state of the at least one modified object is recorded temporally, via the recorder, to compile the temporal record. In an embodiment, the "recorder" is implemented by way of hardware, software, firmware, or a combination of these, suitable for compiling the temporal record of the online collaboration session. Moreover, the term "recording" refers to storing the at least one state of one or more recordable properties of the at least one object or at least one modified object in the digital project, over the time duration of the digital project. This is done by utilizing a recording model that is owned by each object. Herein, the state of the at least one modified object is the recordable property of the at least one modified object. Optionally, the change in the one or more recordable properties of the at least one object or at least one modified object with respect to time is recorded as the at least one track of the digital project. Furthermore, the "temporal record" includes evidence of the collaborative work performed on the digital project, during the online collaboration session. Optionally, the temporal record is a compilation of the at least one track of the digital project. It will be appreciated that authentic moments of ideation and understanding during the online collaboration session are recorded by way of the temporal record.

Optionally, the process of temporally recording the at least one modified object is related to state transitions of the operation object. Each operation declares which recordable properties of objects it operates upon are changed due to its execution. This means that recording changes of these properties may start when operation transitions to "started" state and may finish when operation transitions to "finished" state.

Optionally, the process of temporally recording the at least one modified object is related to capturing states and changes within corresponding properties of the at least one object or the at least one modified object. Herein, recordable properties of the at least one object or the at least one modified object is the state of the object. Notably, for every pair of the at least one object or the at least one modified object and the captured state, a recording track is created. Herein, the recording track represents changes made to a given state of the at least one object or the at least one modified object. Additionally, all changes to the state of the at least one object or the at least one modified object are saved in a frame, wherein the frame is specific to a given type of the state. For instance, the type of state for a two-dimensional (2-D) object may be for transformation, denoted as "transform"; the type of state for a resizable 2-D object may be size of the 2-D object, denoted as "size"; the type of state for the drawing object may be range of visible drawing of the drawing object, denoted as "range of visible drawing"; the type of state for animated object may be current frame of the animated object, denoted "current frame"; and the type of state for multimedia object may be current time of the multimedia object, denoted as "current time". Herein, for all 2-D objects, transformation of all the 2-D objects are recorded as six floating point numbers which are used to describe position, scale and rotation of all the 2-D objects; for resizable 2-D objects, size is recorded as two floating point numbers representing width and height of the 2-D objects; for the drawing object, the range of visible drawing is recorded as two integers, where a first integer may be number of visible lines, and a second integer may be number of visible points in last visible line; for the animated objects, current frame may be recorded as a third integer, where the third integer describes index of currently visible frame of the animated object; for multimedia objects, current time is recorded as one floating point number that describes time in timeline of the multimedia files which is played currently. Herein, each of the at least one object and/or the at least one modified object define their own set of recordable properties, thereby known as type of the state. Notably, the temporal record is a stream of changes to the at least one object or the at least one modified object occurring over duration of the recording, that are initiated independently by multiple users. Thereby, the recording is performed less rigidly as there is digital collaboration with the multiple users as contributors. Furthermore, this allows independent input and individual user's contribution along with allowing multiple viewpoints while recording.

In an embodiment, the at least one object or the at least one modified object and the state of the at least one object or the at least one modified object might not always be mapped one to one. In an exemplary scenario, the at least one object may be a drawing object comprising object data and recorded state. Herein, object data of the drawing object comprises a vector of drawn lines and their respective points. Furthermore, in order to record the process of drawing the number of lines and points must be known and a last drawn line must be visible at any given time. Thereby, the state of the drawing object consists of data which acts as the state of the object describing recordable property of the drawing of the drawing object.

Optionally, the process of temporally recording the at least one modified object is performed in a desynchronized manner. In other words, each device records a state of the digital project independently of other devices.

Optionally, the process of temporally recording the at least one object or the at least one modified object is flexible in nature. Herein, past sections of the temporal record may be changed at any given moment, leading to multiple temporal records. Furthermore, a state of every frame is defined by a chain of recorded changes applied to the existing at least one object or the at least one modified object represented in said frame, thereby forming another temporal record where the at least one modified object reacts to changes performed in the past sections. Consequently, a final recorded state is a combination of multiple temporal records, and might be changed later upon playback.

Optionally, the process of temporally recording the at least one object or the at least one modified object comprises receiving multiple inputs from multiple users at multiple times. These multiple inputs pertain to changing of the state of the at least one object or the at least one modified object. Herein, the recording is multi-layered, as multiple inputs may be provided at multiple times by re-running recording sequence and adding additional modification to the objects. Furthermore, the voice input and/or the video stream of any user may be recorded as at least one object or as the at least one modified object forming additional layers of the captured states.

At (iv), the temporal record is synchronized, via the communication module, amongst the plurality of devices 104. By "synchronizing the temporal record" it is meant that the temporal record is communicated to all users performing the collaborative work on the digital project substantially simultaneously. In other words, "synchronizing the temporal record" pertains to sharing the temporal record between all users working in the online collaborating session at the same time. As a result, said users have an up-to date record of the collaborative work that is performed on the project. This helps said users to be on the same page regarding progress of work on the digital project for collaborating in a very efficient manner. It will be appreciated that the online collaboration recording system 100 serves as an up-to date whiteboard whereupon said users can collaborate efficiently for continuous development and feedback pertaining to the digital project.

Optionally, the temporal record is synchronized by way of the computing arrangement 102. In such a case, the plurality of devices 104 transmit their recorded changes to the at least one object (which are optionally recorded in form of tracks) to the computing arrangement 102 whereat such data unified to compile the temporal record. Thereafter, the temporal record is synchronously transmitted to the plurality of devices 104.

Optionally, in operation the computing arrangement 102 edits the at least one modified object in the temporal record for outputting an output stream, by: (v) receiving, via the communication module or the input interface, a second user input; (vi) editing, via an editor, the temporal record based on the second user input; and (vi) outputting, via an output interface, the output stream based on the edited temporal record. Therefore, the second user input pertains to editing of the temporal record. Such editing of the at least one modified object can be understood to be another "collaboration action" pertaining to the online collaboration session. The output stream comprises the edited temporal record and provides the up-to-date edited temporal record to the plurality of users.

Optionally, the editing of the temporal record is performed in a non-linear manner. Notably, the temporal record can be compiled by assembling recordings of collaborative work performed at various time instants in a flexible manner (for example, by rearranging such recordings, overriding previously saved recordings, and the like). As a result, the editing need not be done in any time-specific manner but any portion of the temporal record. Beneficially, the editing of the temporal record provides a customizable temporal record, thereby creating well-edited temporal records. Therefore, such temporal records provide most relevant information associated with the digital project to all the users who have access to the digital project.

Optionally, the computing arrangement 102, in operation, edits the temporal record by any one of: adding an additional object to the temporal record, removing the at least one modified object from the temporal record, combining a plurality of modified objects in the temporal record, and modifying one or more properties of the at least one modified object in the temporal record. Such editing operations allow for performing object-based editing to modify content of the temporal record. Therefore, the temporal record of the collaborative work on the digital project is customizable according to the users' preferences and/or requirements.

In an example, the temporal record may include three objects, wherein the content of the three objects are three video files. In such a case, one additional object comprising a video file may be added to the temporal record.

In another example, the temporal record may include five objects, wherein the content of the five objects is one audio file each. In such a case, two objects may be removed from the temporal records, thereby resulting in three objects having one audio file each.

In yet another example, the temporal record may include three objects, wherein the content of the two objects is one audio file each and the content of one object is a video file. In such a case, two objects having similar content may be combined in the temporal record.

In still another example, the temporal record may include two objects, wherein the content of the two objects is one video file each. In such a case, two objects may have different properties. Furthermore, in such a case, the properties may be modified in the temporal record for simplification.

Optionally, the computing arrangement 102 allows for recording collaborative edits to the digital projects in a format which allows for later playback and conversion to video on demand. Furthermore, flexible recording format allows to manipulate objects (such as the camera viewfinder location) after edits are made and is not dependent on location of a given user during editing of the digital project.

Optionally, in operation the computing arrangement 102, via an encryption module, encrypts the temporal record prior to synchronizing the temporal record with the plurality of devices 104. The term "encryption" refers to conversion of the temporal record into a specific code, thereby preventing any unauthorized access to the temporal record. Notably, the temporal record is encrypted, via an encryption module, thereby providing security to the temporal record. In such a case, only authorized users can access the temporal record via their associated devices. As a result, there is provided a solution for a safe and secure sharing of the digital project. The encryption can be implemented by various commonly known techniques. Examples of the encryption technique include, but are not limited to, hashing, public-key cryptography, private-key cryptography.

Optionally, in operation the computing arrangement 102 or the plurality of devices 104, via a decryption module, decrypts the encrypted temporal record after synchronization. When the temporal record is encrypted, via the encryption module for providing security to the temporal record, the decryption module is utilized for decrypting the encrypted temporal record after synchronization. Notably, the encrypted temporal record is in form of the specific code which is not easily decoded by the user. However, to allow the encrypted temporal record to be understood and subsequently used by the user there is a need to convert such encrypted temporal record into a readable format. Therefore, the decryption module is used in order to convert the encrypted temporal record into a readable form.

Figure 2:
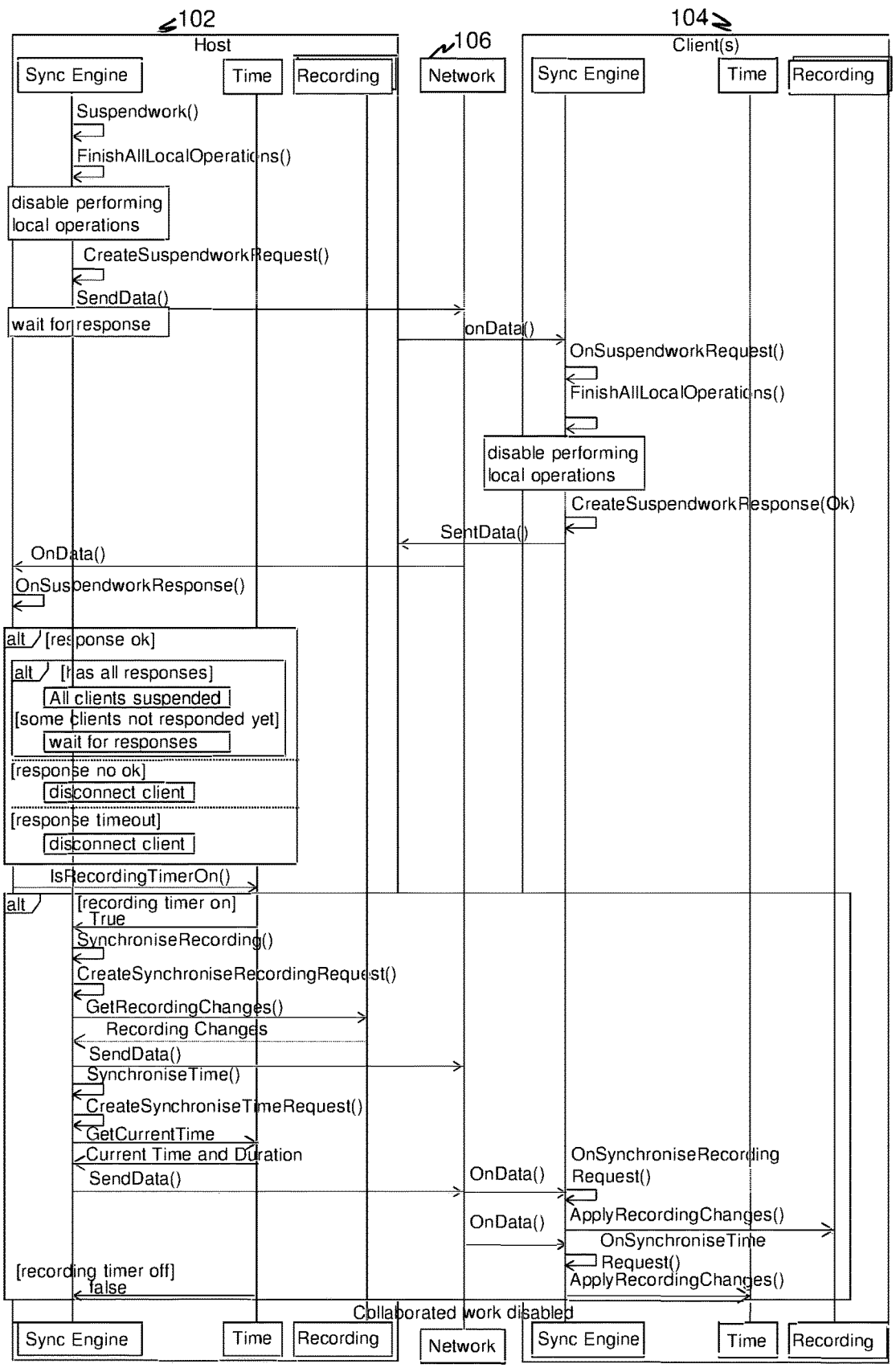
FIG. 2 illustrates an exemplary sequence diagram for suspending ongoing collaborative work using the online collaboration recording system, in accordance with an embodiment of the present disclosure.

FIG. 2 is an exemplary sequence diagram for suspending ongoing collaborative work using the online collaboration recording system 100, in accordance with an embodiment of the present disclosure. In the exemplary sequence diagram, the computing arrangement 102 disables performing local operations and thereafter, sends requests to the plurality of devices 104 to suspend collaborative work, via the communication network 106. Upon receiving the requests to suspend collaborative work, the plurality of devices 104 disable performing of local operations, and thereafter, send responses for said request to the computing arrangement 102, via the communication network 106. The computing arrangement 102 waits to establish a new collaboration session until it receives responses from each device of the plurality of devices 104. Upon receiving responses from each device of the plurality of devices 104, the computing arrangement 102 suspends all ongoing collaborative work.

FIG. 2 is merely an example, which should not unduly limit the scope of the claims herein. A person skilled in the art will recognize many variations, alternatives, and modifications of embodiments of the present disclosure.

Figure 3:
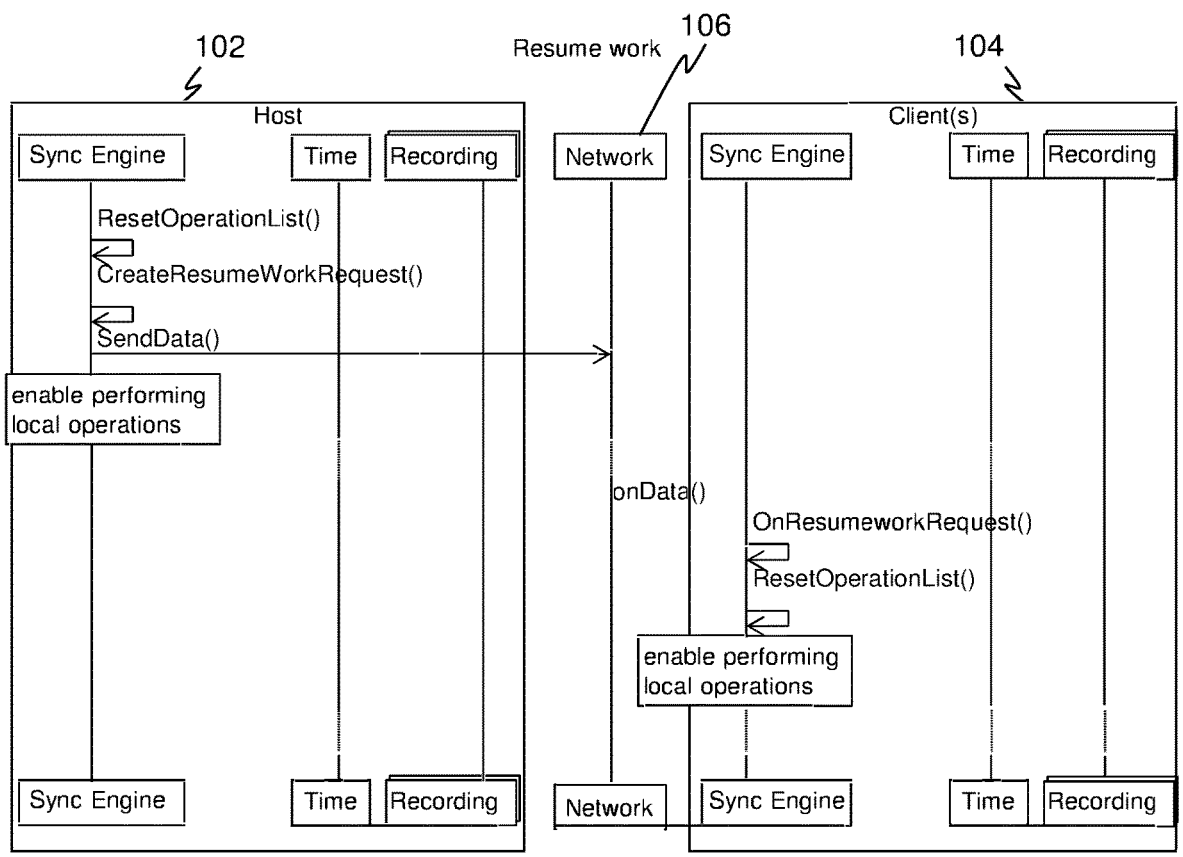
FIG. 3 illustrates an exemplary sequence diagram for resuming collaborative work using the online collaboration recording system, in accordance with an embodiment of the present disclosure.

FIG. 3 is an exemplary sequence diagram for resuming collaborative work using the online collaboration recording system 100, in accordance with an embodiment of the present disclosure. In the exemplary sequence diagram, the computing arrangement 102 resets its operation list and creates "resume work"' requests to be sent to the plurality of devices 104, and enables performing local operations. Such "resume work" requests are sent from the computing arrangement 102 to the plurality of devices 104 via the communication network 106. The plurality of devices 104 execute the "resume work"' requests and reset their operation lists. Thereafter, the plurality of devices 104 enable performing local operations. Once all devices enable performing local operations, collaborative work can be performed on the digital project.

FIG. 3 is merely an example, which should not unduly limit the scope of the claims herein. A person skilled in the art will recognize many variations, alternatives, and modifications of embodiments of the present disclosure.

Optionally, resuming collaborative work using the online collaboration recording system 100, the computing arrangement 102 aggregates updates to a plurality of digital projects that are sent to a first group of devices connected to the computing arrangement 102 until a new device sends an open project confirmation request to the computing arrangement 102. Such a new device from the second group sends the open project confirmation request after receiving and loading the digital project into memory. Upon receiving the open project confirmation request, the computing arrangement 102 sends all project updates to said new device followed by "resume work" request. The new device executes all project updates as received. Upon receiving "resume work" request, the new device is considered as fully connected with the up-to-date digital project which gives an end-user associated with the new device the ability to perform collaborative work on the digital project.

Figure 4:
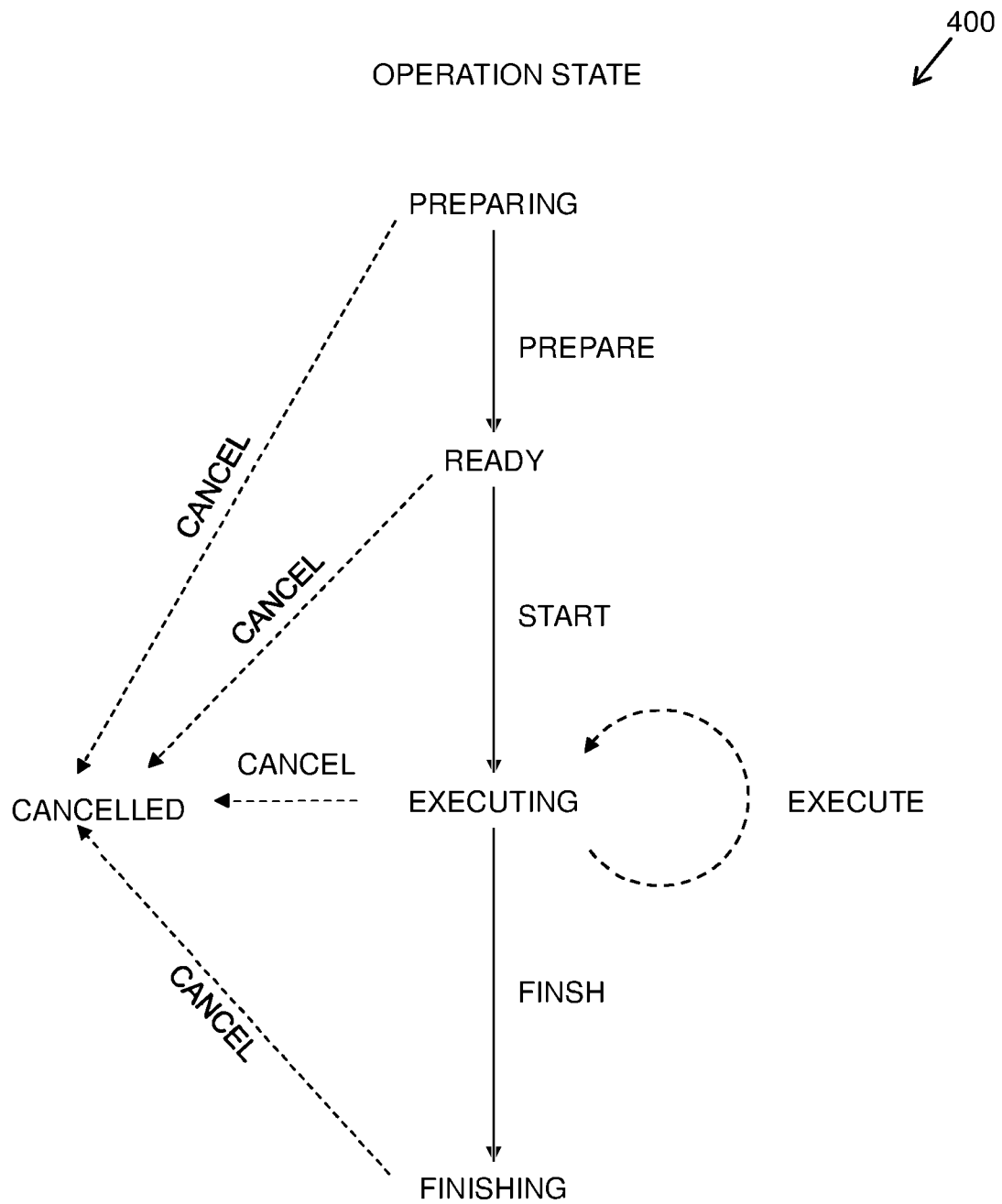
FIG. 4 illustrates an exemplary operation object, in accordance with an embodiment of the present disclosure.

FIG. 4 illustrates an exemplary operation object 400, in accordance with an embodiment of the present disclosure. As shown, the exemplary operation object 400 details various states of at least one operation that is to be performed on a given object of the digital project. Notably, the at least one operation pertains to the at least one collaboration action that is to be performed for the given object. Upon implementation of a given operation, the given object undergoes a state transition from one state to another state. Optionally, such a state transition is communicated (for example, using a WebRTC data channel) from a first device (namely, an initiating device of a user who initiates the given operation) to a second device (namely, a receiving device of a user who receives an update of the given operation) by sending an operation message with information specific to state transition and operation type pair that would allow for recreation of the given operation by the second user. It will be appreciated that since the operation object 400 is generic in nature, it allows for performing discrete operations (for example, such as changing colour of an object) as well as long, continuous operations (for example, such as moving an object by moving a finger on a screen of a device).

The exemplary operation object 400 depicts five states of an operation (such as preparing, readying, executing, cancelling and finishing) that is to be performed on the given object of the digital project.

Optionally, the receiving device is: a device among the plurality of devices 104, the computing arrangement 102.

FIG. 4 is merely an example, which should not unduly limit the scope of the claims herein. A person skilled in the art will recognize many variations, alternatives, and modifications of embodiments of the present disclosure.

Figure 5A:
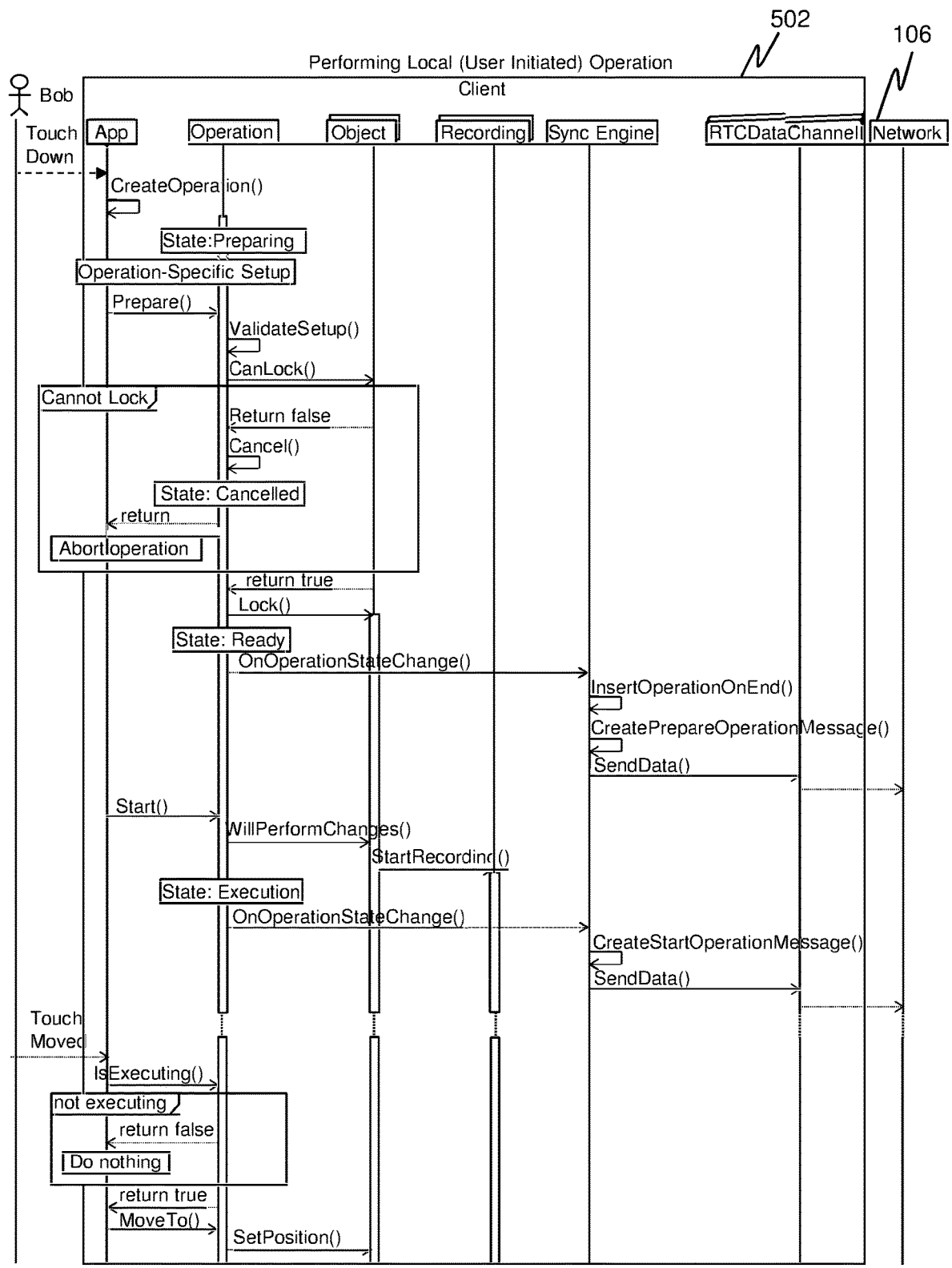
FIGS. 5A and 5B illustrate an exemplary sequence diagram for a given operation transfer between an initiating device and a receiving device whilst performing collaborative work, from a perspective of the initiating device, in accordance with an embodiment of the present disclosure.
Figure 5B:
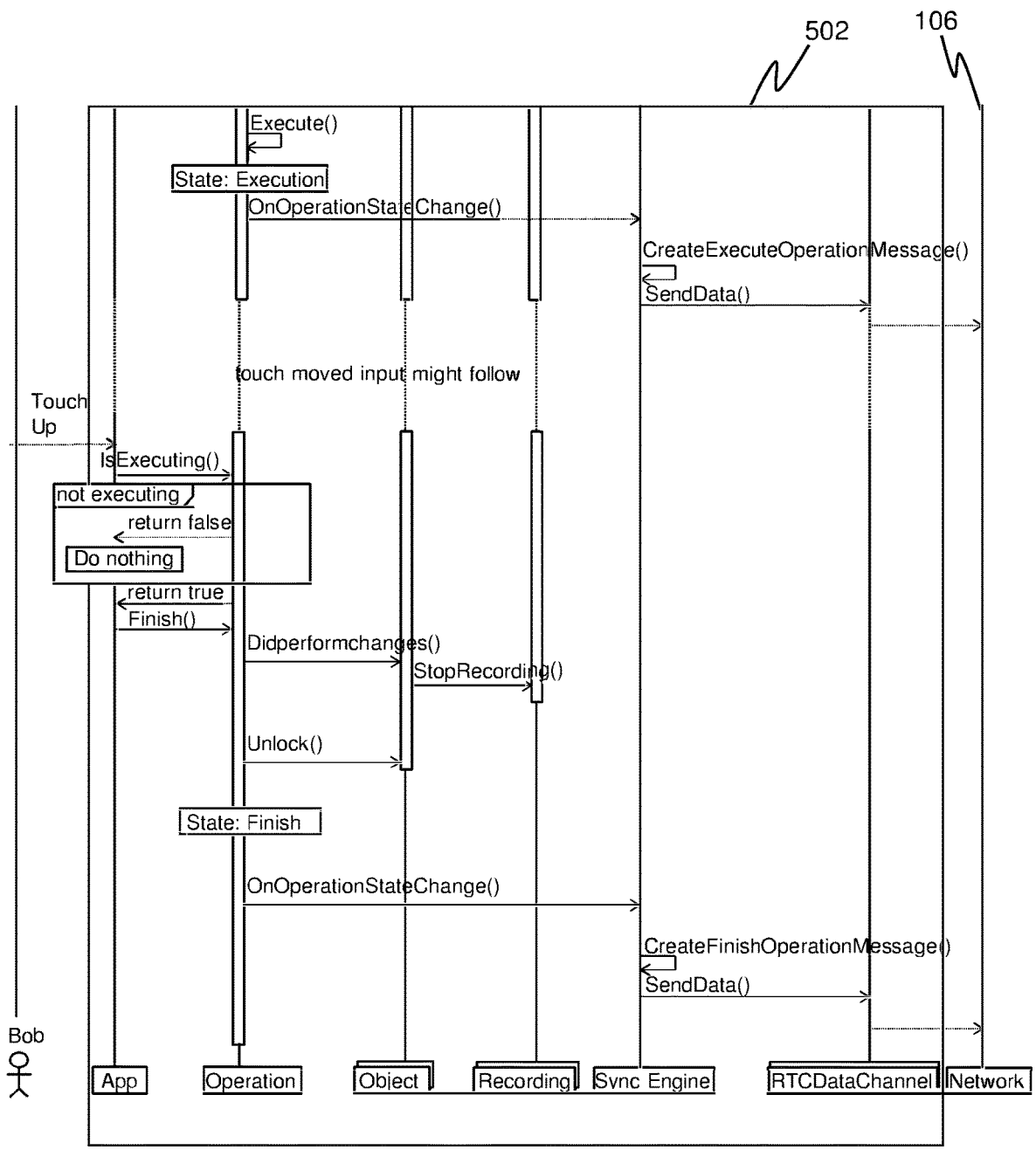

FIGS. 5A and 5B illustrate an exemplary sequence diagram for a given operation transfer between the initiating device 502 and the receiving device whilst performing collaborative work, from a perspective of the initiating device, in accordance with an embodiment of the present disclosure. In FIGS. 5A and 5B, the initiating device 502 creates an operation that is to be performed upon the given object, based upon an input from the user associated with the initiating device 502. An operation-specific setup is prepared and validated at the initiating device 502. If the operation-specific setup is unable to lock the object, the operation is aborted. If the operation-specific setup is able to lock the object, the operation is said to be in ready state. The initiating device 502 transmits the operation-specific setup to the receiving device via the communication network 106, whilst also starting execution of the operation locally. The operation stays in executing state until it attains completion (namely, finishing) or is cancelled.

FIGS. 5A and 5B are merely examples, which should not unduly limit the scope of the claims herein. A person skilled in the art will recognize many variations, alternatives, and modifications of embodiments of the present disclosure.

Figure 6A:
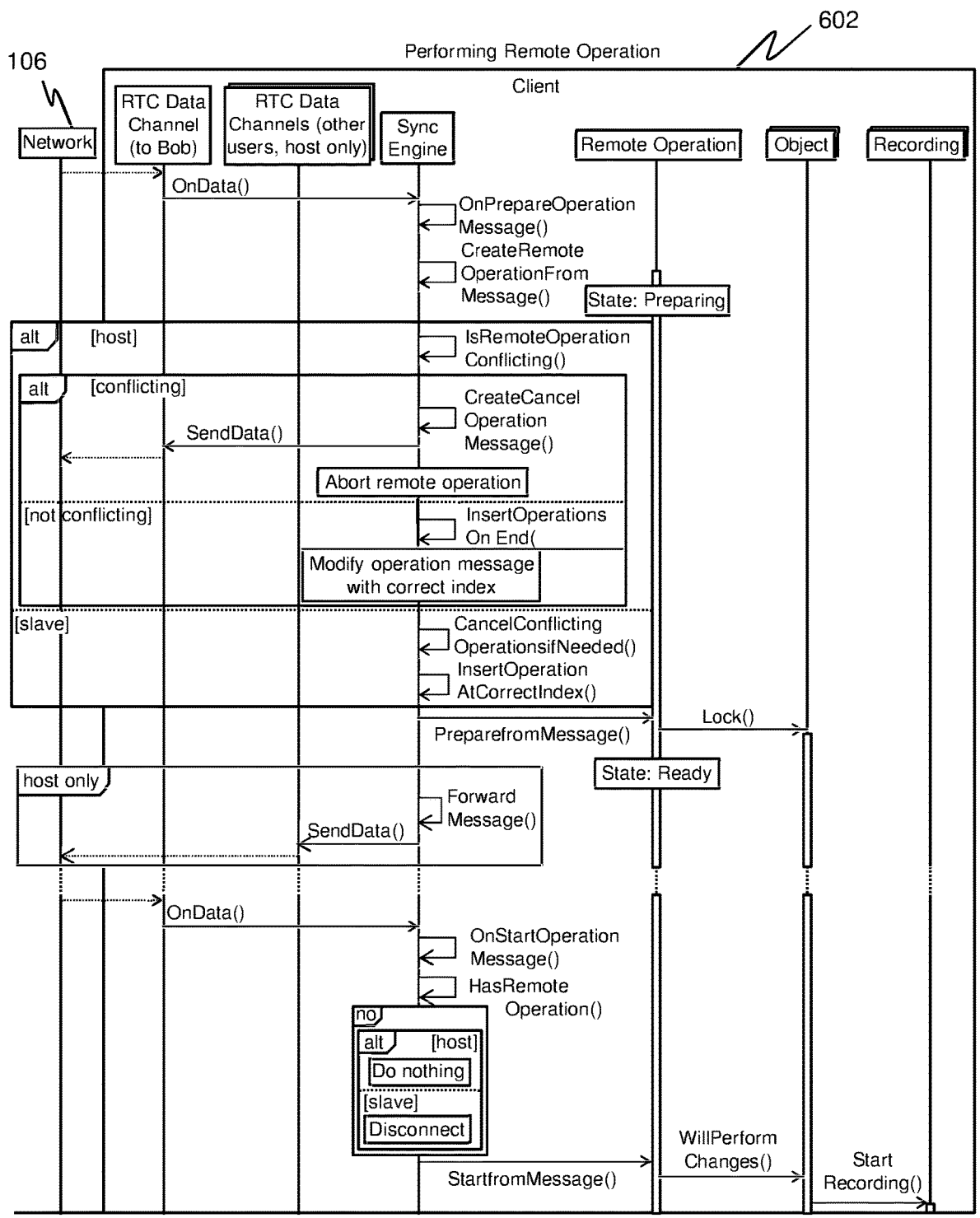
FIGS. 6A and 6B illustrate an exemplary sequence diagram for the given operation transfer of FIGS. 5A and 5B, from a perspective of the receiving device, in accordance with an embodiment of the present disclosure.
Figure 6B:
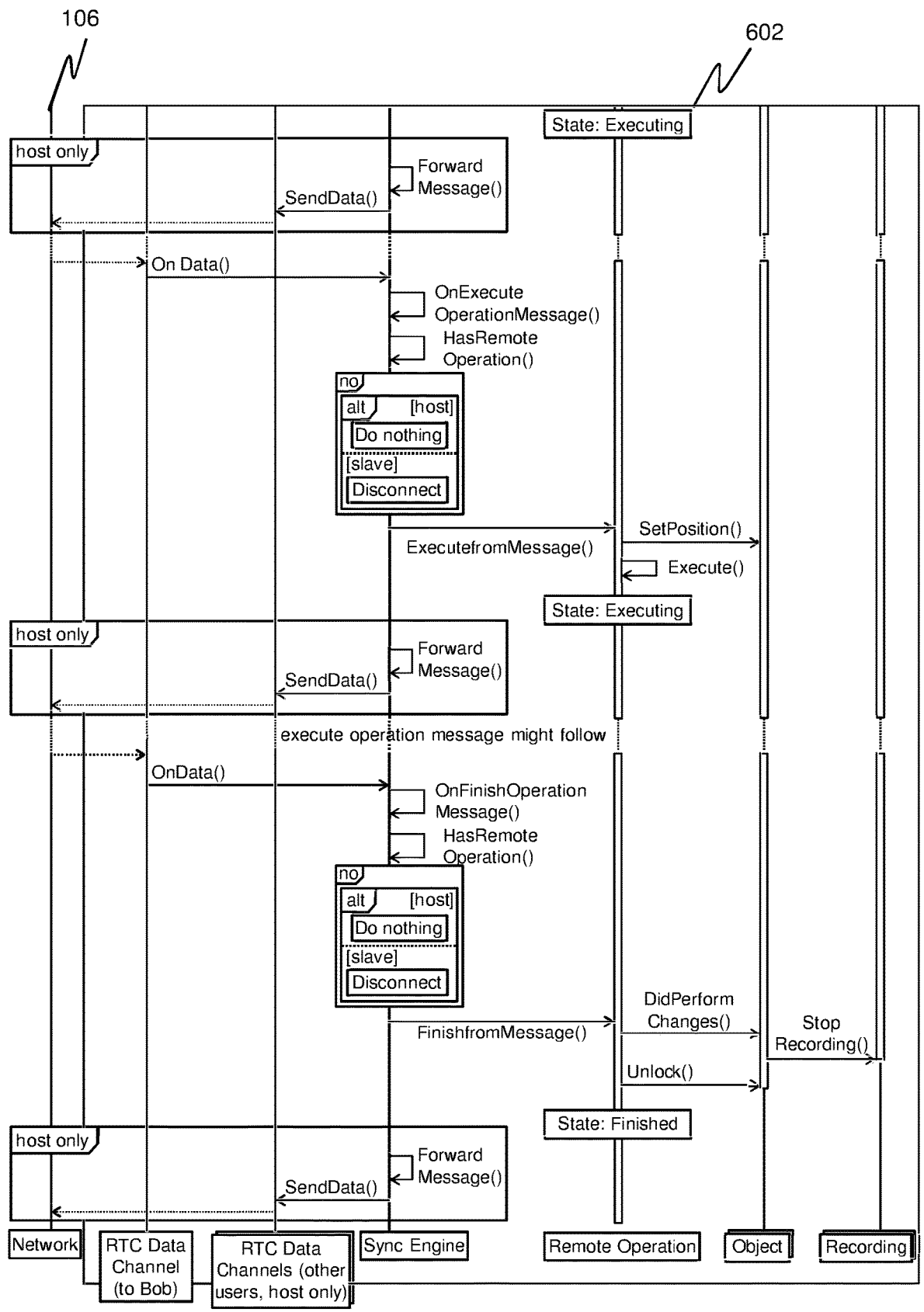

FIGS. 6A and 6B illustrate an exemplary sequence diagram for the given operation transfer of FIGS. 5A and 5B, from a perspective of the receiving device 602, in accordance with an embodiment of the present disclosure. In FIGS. 6A and 6B, the receiving device 602 receives the operation-specific setup transmitted by the initiating device 502, via the communication network 106. Subsequently, at the receiving device 602, a state of a remote operation changes to 'preparing'. Thereafter, the remote operation is checked for possible conflicts, and its status changes to 'ready' when all conflicts (if any) are resolved. The receiving device 602 begins executing the remote operation. The remote operation stays in executing state until it attains completion (namely, finishing) or is cancelled.

FIGS. 6A and 6B are merely examples, which should not unduly limit the scope of the claims herein. A person skilled in the art will recognize many variations, alternatives, and modifications of embodiments of the present disclosure.

Figure 7:
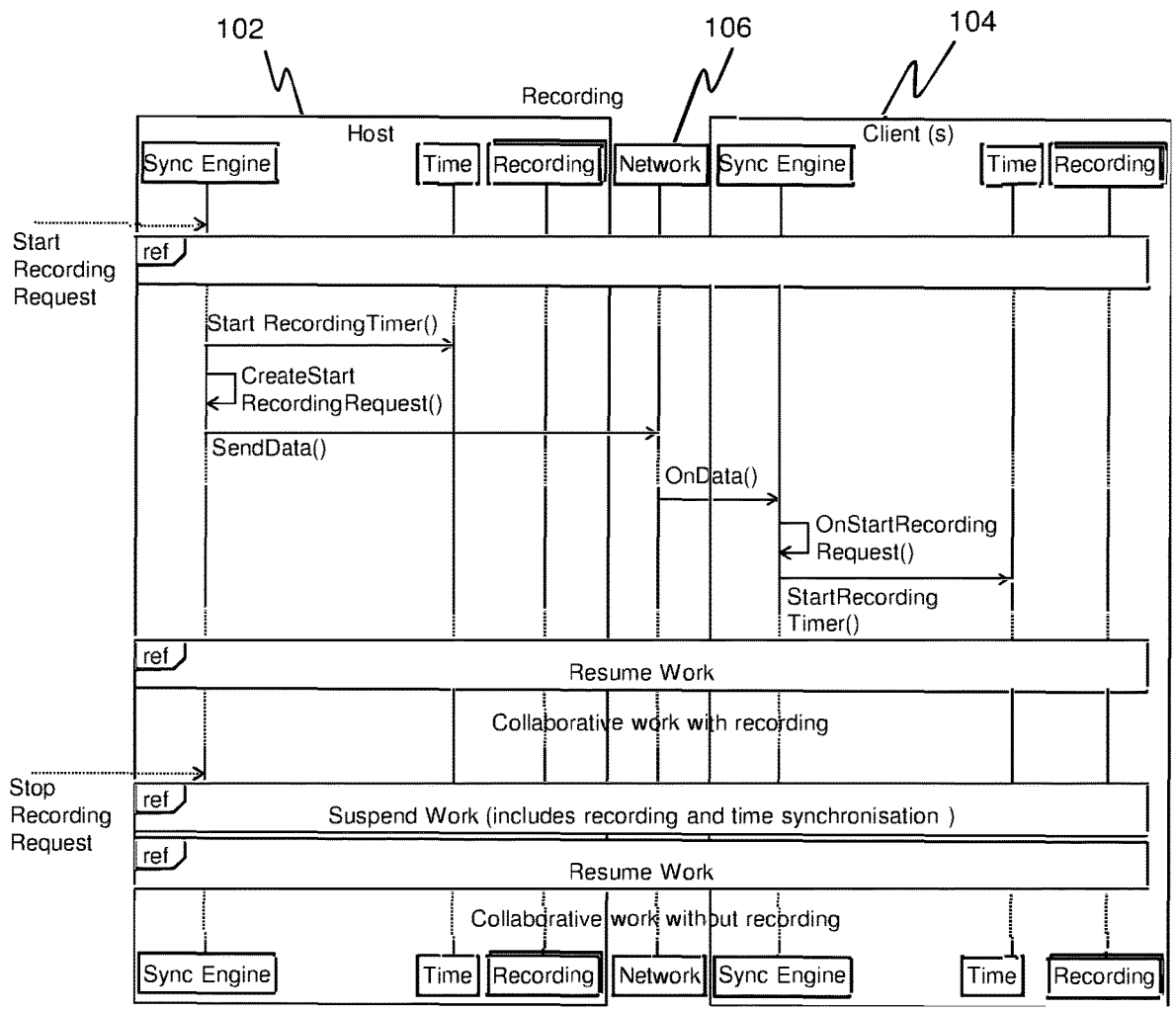
FIG. 7 is an exemplary sequence diagram for recording at least one modified object to compile the temporal record, in accordance with an embodiment of the present disclosure.

FIG. 7 is an exemplary sequence diagram for recording the at least one modified object to compile the temporal record, in accordance with an embodiment of the present disclosure. At first, a recording request is sent from the computing arrangement 102 to the plurality of devices 104, via the communication network 106. Subsequently, work is suspended within the online collaboration session. A recording timer is started and recording begins at the plurality of devices 104. Thereafter, work is resumed within the online collaboration session. Collaborative work is performed whilst being recorded until a request to stop recording is sent from the computing arrangement 102 to the plurality of devices 104. Upon this, recording is suspended and collaborative work on the digital project is resumed without recording.

Figure 8:
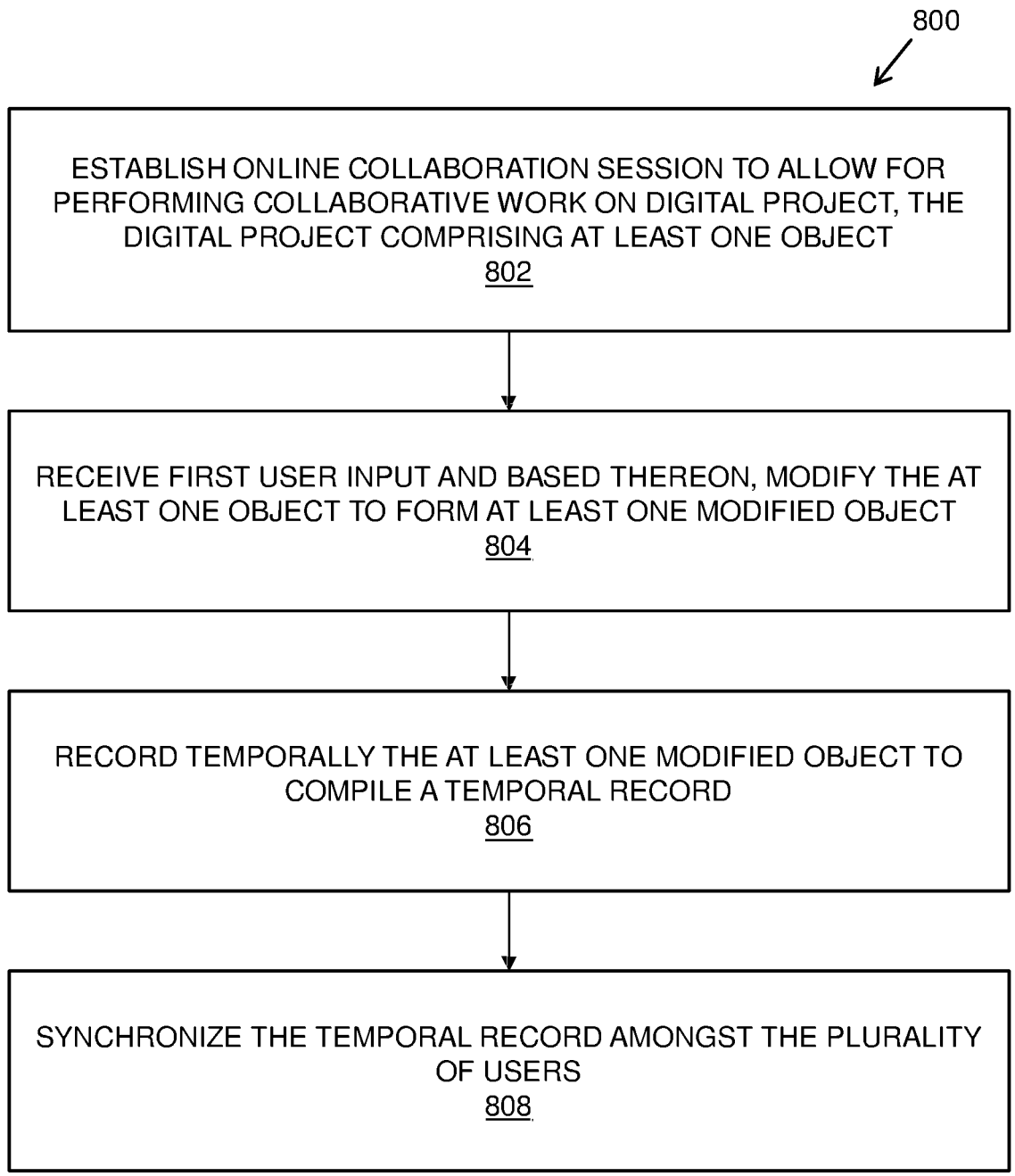
FIG. 8 illustrates step of a method for recording an online collaboration session, in accordance with an embodiment of the present disclosure.

FIG. 8 illustrates step of a method 800 for recording an online collaboration session, in accordance with an embodiment of the present disclosure. At a step 802, the online collaboration session is established to allow for performing simultaneous collaborative work on a digital project, the digital project comprising at least one object, wherein the digital project is shared and simultaneously modified between a plurality of users. At a step 804, the first user input is received from one of the plurality of users and based thereon the at least one object is modified to form at least one modified object. At a step 806, the at least one modified object is recorded temporally to compile the temporal record. At a step 808, the temporal record is synchronized amongst the plurality of users.

The steps 802 to 808 are only illustrative and other alternatives can also be provided where one or more steps are added, one or more steps are removed, or one or more steps are provided in a different sequence without departing from the scope of the claims herein.

Figure 9:
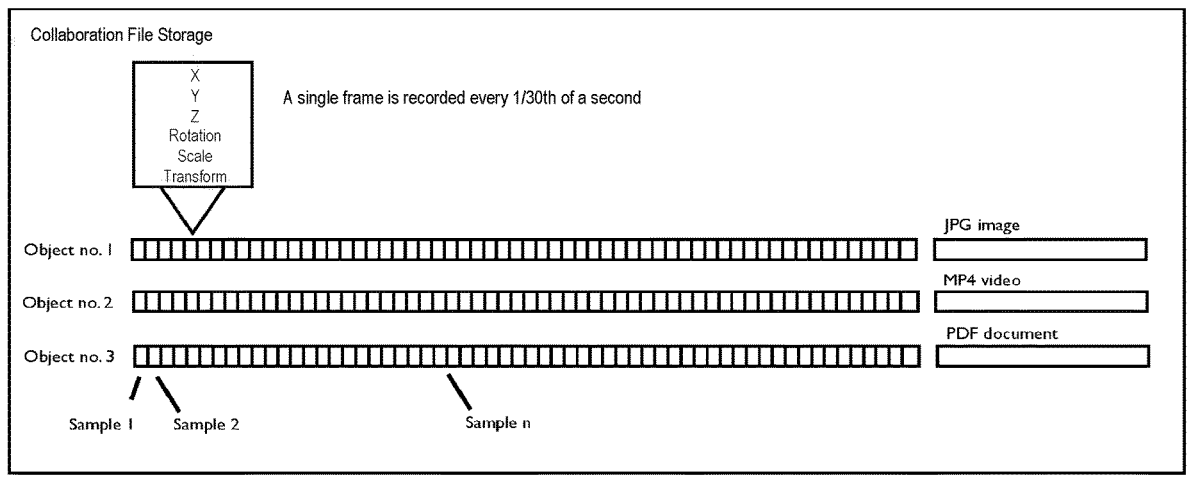
FIG. 9 illustrates a formation of a chain of changes in objects' properties, in accordance with an embodiment of the present disclosure.
Figure 10A:
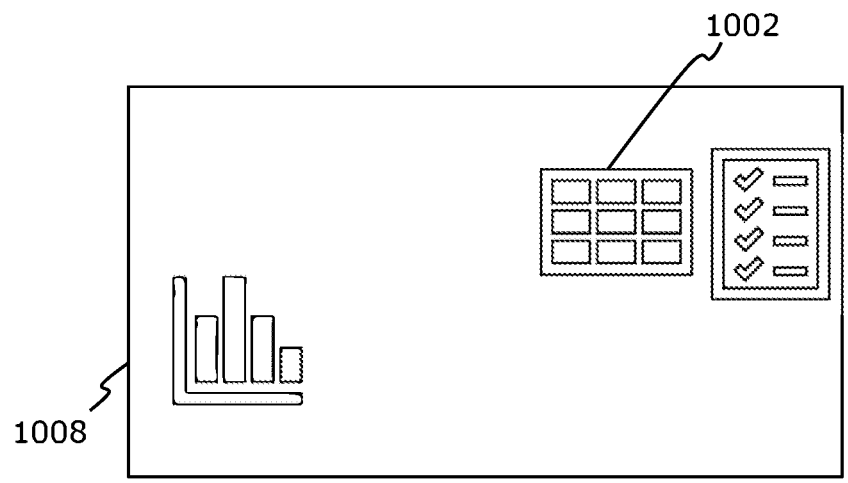
FIGS. 10A, 10B and 10C are exemplary illustrations of digital project contents and a camera viewfinder frame visible from a user viewport visible to a first user (i.e., a host), the camera viewfinder frame visible from a user viewport visible to a second user, in accordance with an embodiment of the present disclosure.
Figure 10B:
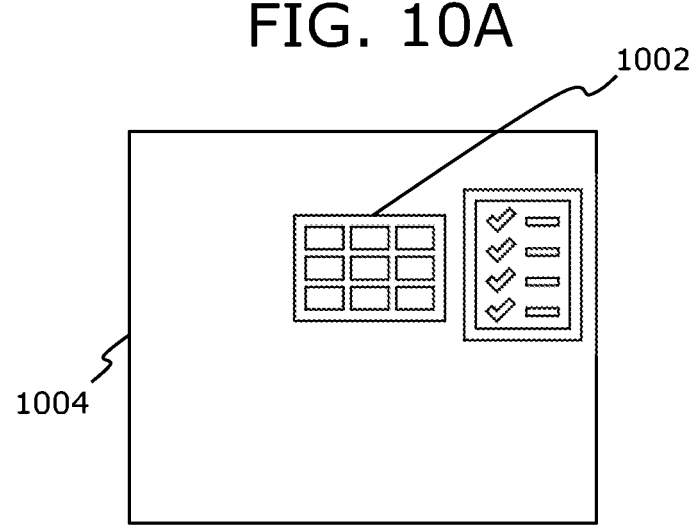
Figure 10C:
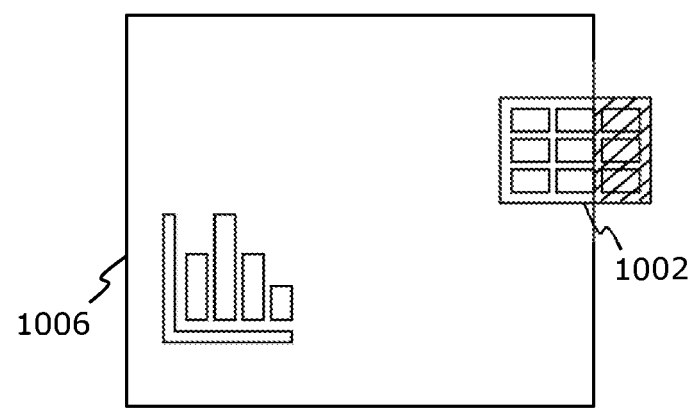

FIG. 9 illustrates a formation of a chain of changes in objects' properties, which provides further details of the embodiments of the present disclosure. FIGS. 10A, 10B and 10C are exemplary illustrations of digital project contents and a camera viewfinder frame 1002 visible from a user viewport 1004 visible to a first user (i.e., a host), the camera viewfinder frame 1002 visible from a user viewport 1006 visible to a second user, in accordance with an embodiment of the present disclosure. FIG. 10A is an exemplary representation of 2-D digital project contents. Notably, a bounding frame 1008 of the digital project contents might be artificial since the digital project may be infinite in 2-D space, but in the present exemplary illustration, no additional content lies outside the bounding frame 1008 of the digital project contents. The digital project comprises a bar chart object, a table object, and a list object. Herein, the camera viewfinder frame 1002 shows a frame which covers the table object. FIG. 10B represents the user viewport 1004 of the host, as viewed by the host only, wherein the user viewport 1004 comprises the table object and the list object. The user viewport 1004 of the host also covers the camera viewfinder frame 1002. FIG. 10C represents the user viewport 1006 of the second user, as viewed by the second user only, which covers the bar chart object and the table object, wherein the table object is not entirely within the user viewport 1006. Herein, shaded portion of the table object is not visible to the second user but is still covered by the camera viewfinder frame 1002.

FIG. 10A further represents temporal record that is recorded during an online collaborative session involving users operating in the user viewport 1004 of the host and the user viewport 1006 of the second user, wherein the bounding frame 1008 of the digital project contents of said temporal record comprises recordings of all objects and their state changes. Herein, the state changes are recorded regardless of any specific user viewport or camera viewfinder frame locations, but the camera viewfinder frame 1002 describes specific area of the digital project to be shown while replaying project on user request, or when converting such recording to a video format. Typically, visual content lying outside bounds of the user viewport 1004 is not visible to the host and is not recorded when recording collaborative sessions. Thus, for example, the bar chart object (shown in FIG. 10C) and its state changes would not have been recorded by existing collaboration systems. In contrast, the embodiments of the present disclosure beneficially enable: recording of the objects and their state changes both outside the camera viewfinder frame 1002 and outside of the user viewport 1004 of the host, so the temporal record thus created is a true representation of collaborative changes made to states of all the objects during a session, performing changes by the host in an area outside of the area covered by the camera viewfinder frame 1002, like the list object to be moved into area of the camera viewfinder frame 1002 during project recording, and host control over area covered by camera viewfinder, like moving the camera viewfinder frame 1002 from the table object to the list object, wherein the host control is not limited to manipulation during the recording due to a camera being a regular object (as an example, host might decide to change camera viewfinder frame location to one covering the bar chart object for a period of recorded session, when second user was making changes to it).

Optionally, the method 800 further comprises: receiving a second user input; editing the temporal record based on the second user input; and outputting the output stream based on the edited temporal record.

Optionally, in the method 800, editing the temporal record comprises any one of: adding an additional object to the temporal record, removing the at least one modified object from the temporal record, combining a plurality of modified objects in the temporal record, and modifying one or more properties of the at least one modified object in the temporal record.

Optionally, in the method 800, the at least one object or at least one modified object comprises one or more properties, the one or more properties comprises one or more of an on-screen position, on screen size and content of the at least one object or at least one modified object.

Optionally, in the method 800, the content of the at least one object or at least one modified object comprises a set of temporal changes in properties of the at least one object or properties of the at least one modified object over a recorded period of time and/or one or more of a video file or an audio file.

Optionally, in the method 800, the at least one object or the at least one modified object is stored at a local data storage or a remote data storage as a set of objects or modified objects and temporal changes to each of the objects and modified objects.

Optionally, the method 800 further comprises encrypting the temporal record prior to synchronizing the temporal record with the plurality of devices.

Optionally, the method 800 further comprises decrypting the temporal record after synchronizing the temporal record with the plurality of devices.

In yet another aspect, an embodiment of the present disclosure provides a computer program product comprising instructions to cause the aforementioned online collaboration recording system to carry out the aforementioned method. Specifically, the computer program product comprises a non-transitory machine-readable data storage medium having stored thereon program instructions that, when accessed by the computing arrangement, cause the computing arrangement to execute the aforementioned method.

The present disclosure provides the aforementioned online collaboration recording system and the aforementioned method for recording an online collaboration session. The online collaboration recording system allows for compiling a temporal record of an entirety or a portion of collaborative work performed during the online collaboration session and not simply an end result of such collaborative work. As a result, a viewer of the temporal record is provided useful contextual information pertaining to the collaborative work performed during the online collaboration session. Beneficially, the temporal record is compiled as a core functionality of the online collaboration recording system. Moreover, the online collaboration recording system optionally allows for editing the temporal record by way of object-based editing to modify content of the temporal record. The online collaboration recording system provides a single solution for creation, execution, recording, and sharing of the collaborative work between multiple users. The aforementioned method is easy to implement, and allows for capturing the online collaboration session in a non-linear manner. Specifically, the temporal record can be compiled by assembling recordings of collaborative work performed at various time instants in a flexible manner (for example, by rearranging such recordings, overriding previously saved recordings, and the like). Furthermore, the online collaboration recording system can be easily integrated with existing networks, file storage systems, devices and the like. Therefore, cost of implementing such a system are very nominal.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method comprising:
   establishing, by computing hardware, an online collaboration session for enabling a plurality of remote computing devices to access and modify a digital project, the digital project comprising a set of objects and each respective object in the set of objects having a respective set of properties;

providing, by the computing hardware, each of the plurality of remote computing devices with access to the digital project during the collaboration session;

enabling, by the computing hardware, each of the plurality of remote computing devices to modify the set of objects during the online collaboration session;

receiving, by the computing hardware from one or more of the plurality of remote computing devices, a plurality of object modification events to one or more of the set of objects, each of the modification events defining:

a respective initial object state of each respective object of the one or more of the set of objects, the respective initial object state defining a respective initial set of properties for each respective object;

a respective final object state of each respective object, the respective final object state defining a respective final set of properties for each respective object following a respective modification event of the plurality of modification events;

a respective modification time of each respective modification;

storing, by the computing hardware for each respective object in the set of objects, a respective chain of modification events for each respective object during the collaboration session;

receiving, by the computing hardware from a particular computing device, a request to replay the online collaboration session;

in response to receiving the request to replay the online collaboration session, generating a recreation, by the computing hardware, of the collaboration session by:

generating a representation of the digital project that includes the set of objects, each respective object in the set of objects having the respective set of properties; and progressing each respective object in the set of objects through the respective chain of modification events by modifying the respective initial set of properties to the respective final set of properties at each respective modification time to transition each respective object from the respective initial object state to the respective final object state in a time and manner that corresponds to the plurality of object modification events as the plurality of object modification events occurred during the collaboration session; and providing, by the computing hardware, the recreation of the collaboration session for display on the particular computing device.

2. The method of claim 1, wherein the respective set of properties comprise one or more of:

a respective on-screen position of the respective object;
a respective on-screen size of the respective object; or
a respective content of the respective object.

3. The method of claim 1, further comprising:

receiving, by the computing hardware from the particular computing device, a first request to modify a first object in the set of objects during the recreation of the collaboration session, the first request include a modification to at least one property in the respective set of properties for the first object; and in response to receiving the first request to modify the first object in the set of objects, modifying, by the computing hardware, the respective chain of modification events for the first object in the design project based on the request to modify the first object.

4. The method of claim 3, wherein modifying the respective chain of modification events for the first object based on the request to modify the first object comprises replacing at least a portion of the respective chain of modification events subsequent to the respective modification time of the first request.

5. The method of claim 1, wherein:

the set of objects comprises a viewfinder object defining an on-screen rectangle representing a portion of the digital project that is visible during the recreation of the collaboration session; and providing the recreation of the collaboration session for display on the particular computing device comprises providing the recreation such that the portion of the digital project that is visible on the particular computing device that is visible during the recreation of the collaboration session is defined by the on-screen rectangle.

6. The method of claim 5, wherein the viewfinder object is defined by one or more of:

a first viewport of a first remote computing device of the plurality of remote computing devices representing a portion of the digital project visible on the first remote computing device during the collaboration session;

a type of the digital project; or a second viewport defining a user-selected viewport.

7. The method of claim 5, wherein storing the respective chain of modification events for each respective object during the collaboration session comprises storing plurality of object modification events including each object modification event of the plurality of object modification events that occur outside of the on-screen rectangle defined by the viewfinder object.

8. A non-transitory computer-readable medium having program code that is stored thereon, the program code executable by one or more processing devices for performing operations comprising:

establishing an online collaboration session for enabling a plurality of remote computing devices to access and modify a digital project, wherein:

the digital project comprises a first object and a second object;

the first object has a first set of properties, and the second object has a second set of properties;

the first object is associated with a first object state track that defines the first set of properties over time during the collaboration session;

the second object is associated with a second object state track that defines the second set of properties over time during the collaboration session;

receiving, from a first remote computing device of the plurality of remote computing devices, a first modification event for the first object, the first modification event comprising a first modification to a first property of the first set of properties at a first time;

in response to receiving the first modification event, modifying the first state track to include the first modification at the first time; and subsequent to the collaboration session, generating a recreation of the collaboration session by:

generating a representation of the digital project that includes the first object having the first set of properties and the second object having the second set of properties; and modifying the first object according to the first state track and the second object according to the second state track by progressing the first object through the first state track and the second object through the second state track.

9. The non-transitory computer-readable medium of claim 8, wherein
the first set of properties comprise one or more of:
a first on-screen position of the first object;
a first on-screen size of the first object; or
a first content of the first object; and
the second set of properties comprise one or more of:
a second on-screen position of the second object;
a second on-screen size of the second object; or
a second content of the second object.

10. The non-transitory computer-readable medium of claim 8, wherein:
the operations further comprise receiving a set of modification events identifying the second object, each modification event in the set of modification events originating from a respective remote computing device of the plurality of respective computing devices and comprising a respective modification to a particular property of the second set of properties at a respective time; and
generating the recreation of the collaboration session comprises progressing the second object though the second state track by modifying each particular property of the second set of properties according to the respective modification at the respective time.

11. The non-transitory computer-readable medium of claim 8, wherein:
the digital project comprises a viewfinder object; and
the viewfinder object defines an on-screen rectangle representing a portion of the digital project that is to be visible during the recreation of the collaboration session.

12. The non-transitory computer-readable medium of claim 11, wherein the operations further comprise:
modifying the first state track and the second state track according to modifications events identifying the first object and the second object that occur outside of the viewfinder object.

13. The non-transitory computer-readable medium of claim 11, wherein the viewfinder object is defined by one or more of:
a first viewport of the first remote computing device representing a first portion of the digital project visible on the first remote computing device during the collaboration session;
a second viewport of a second remote computing device of the plurality of remote computing devices representing a second portion of the digital project visible on the second remote computing device during the collaboration session;
a third viewport defining a user-selected viewport; or
a type of the digital project.

14. The non-transitory computer-readable medium of claim 8, wherein the operations further comprise:
receiving, from a second remote computing device of the plurality of remote computing devices during the recreation of the collaboration session, a second modification event for the first object, the second modification event comprising a second modification to the first property at a second time in the collaboration session; and in response to receiving the second modification event, modifying the first state track based on the second modification event.

15. A system comprising:
a non-transitory computer-readable medium storing instructions; and
processing hardware communicatively coupled to the non-transitory computer-readable medium, wherein the processing hardware is configured to execute the instructions and thereby perform operations comprising:
establishing an online collaboration session for enabling a plurality of remote computing devices to access and modify a digital project, wherein:
the digital project comprises a set of objects;
each respective object in the set of objects has a respective set of properties;
each respective object is associated with a respective state track that defines a respective state of each respective object over time during the collaboration session; and
the respective state of each respective object over time defines a respective property of the respective set of properties for the respective object at a particular respective time during the collaboration session;
receiving, from one or more of the plurality of remote computing devices, a plurality of object modification events to one or more of the set of objects, each of the modification events comprising a modification to the respective property for the respective object at the particular respective time;
in response to receiving each modification event of the plurality of object modification events, modifying the respective state track for the respective object identified by the modification event to include the modification to the respective property at the particular respective time; and
subsequent to the collaboration session, generating a recreation of the collaboration session by:
generating a representation of the digital project that includes the set of objects such that each respective object in the set of objects initially has the respective set of properties; and
modifying each respective set of prosperities according to the respective state track by progressing each respective object through the respective state track.

16. The system of claim 15, wherein the set of objects comprises a viewfinder object defining an on-screen rectangle representing a portion of the digital project that is to be visible during the recreation of the collaboration session.

17. The system of claim 16, wherein the operations further comprise:
providing the recreation of the collaboration session for display on a particular computing device;
displaying, during the recreation of the collaboration session on the particular computing device, a second portion of the digital project defined by a second on-screen rectangle controlled by a user of the particular computing device, the second on-screen rectangle being independent of the viewfinder object; and enabling the user to cause the particular computing device to alternatively display one of:
the on-screen rectangle such that the second portion of the digital project comprises the on-screen rectangle; or
the second on-screen rectangle.

18. The system of claim 16, wherein the operations further comprise:
providing the recreation of the collaboration session for display on the particular computing device; and
limiting the particular computing device to displaying the on-screen rectangle during the recreation of the collaboration session.

19. The system of claim 16, wherein establishing the online collaboration session occurs in response to a request form a host computing device of the plurality of computing devices.

20. The system of claim 19, wherein the viewfinder object is defined by one or more of:
a first viewport of the host computing device of the plurality of remote computing devices representing a first portion of the digital project visible on the host remote computing device during the collaboration session;
a second viewport of a second computing device of the plurality of remote computing devices representing a second portion of the digital project visible on the second remote computing device during the collaboration session; or
a third viewport defining a user-selected viewport.

* * * * *